(12) United States Patent
Portwood

(10) Patent No.: US 6,241,035 B1
(45) Date of Patent: Jun. 5, 2001

(54) SUPERHARD MATERIAL ENHANCED INSERTS FOR EARTH-BORING BITS

(75) Inventor: Gary R. Portwood, Kingwood, TX (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 09/206,902

(22) Filed: Dec. 7, 1998

(51) Int. Cl.$^7$ .............................. E21B 10/16; E21B 10/52
(52) U.S. Cl. ........................ 175/374; 175/430; 175/432
(58) Field of Search ................................. 175/374, 428, 175/430, 432, 434

(56) References Cited

U.S. PATENT DOCUMENTS

| | | | |
|---|---|---|---|
| 4,148,368 | 4/1979 | Evans | 175/329 |
| 4,339,009 | 7/1982 | Busby | 175/374 |
| 4,359,335 | 11/1982 | Garner | 75/208 R |
| 4,629,373 | 12/1986 | Hall | 407/118 |
| 4,694,918 | 9/1987 | Hall | 175/329 |
| 4,722,405 | 2/1988 | Langford, Jr. | 175/374 |
| 4,832,139 | 5/1989 | Minikus et al. | 175/374 |
| 4,940,099 | 7/1990 | Deane et al. | 175/374 |
| 5,131,480 | 7/1992 | Lockstedt et al. | 175/374 |
| 5,172,777 | 12/1992 | Siracki et al. | 175/374 |
| 5,248,006 | 9/1993 | Scott et al. | 175/420.2 |
| 5,273,125 | 12/1993 | Jurewicz | 175/420.2 |
| 5,282,512 | 2/1994 | Besson et al. | 175/374 |
| 5,287,936 | 2/1994 | Grimes et al. | 175/331 |
| 5,322,138 | 6/1994 | Siracki | 175/374 |
| 5,341,890 | 8/1994 | Cawthorne et al. | 175/374 |
| 5,351,770 | 10/1994 | Cawthorne et al. | 175/374 |
| 5,370,195 | 12/1994 | Keshavan et al. | 175/420.2 |
| 5,379,854 | 1/1995 | Dennis | 175/434 |
| 5,469,927 | 11/1995 | Griffin | 175/432 |
| 5,499,688 | 3/1996 | Dennis | 175/426 |
| 5,542,485 | 8/1996 | Pessier et al. | 175/371 |
| 5,592,995 | 1/1997 | Scott et al. | 175/374 |
| 5,607,024 | 3/1997 | Keith et al. | 175/431 |
| 5,667,028 | 9/1997 | Truax et al. | 175/428 |
| 5,722,499 | 3/1998 | Nguyen et al. | 175/431 |
| 5,746,280 | 5/1998 | Scott et al. | 175/374 |
| 5,752,573 | 5/1998 | Scott et al. | 175/374 |
| 5,766,394 | 6/1998 | Anderson et al. | 156/89.11 |
| 5,971,087 | * 10/1999 | Chaves | 175/430 |
| 6,059,054 | * 5/2000 | Portwood et al. | 175/430 |

FOREIGN PATENT DOCUMENTS

| | | |
|---|---|---|
| 0 029 535 A1 | 6/1981 | (EP) . |
| 2 029 550 | 10/1970 | (FR) . |
| 2 268 940 | 11/1975 | (FR) . |
| 1014433 | 12/1965 | (GB) . |
| 2 279 095 | 12/1994 | (GB) . |
| 2 316 111 | 2/1998 | (GB) . |
| 2 334 278 | 8/1999 | (GB) . |
| WO 97/48876 | 12/1997 | (WO) . |

* cited by examiner

*Primary Examiner*—William Neuder
(74) *Attorney, Agent, or Firm*—Rosenthal & Osha L.L.P.

(57) ABSTRACT

Superhard material enhanced inserts and methods of making the same have been disclosed. The enhanced insert includes a body portion adapted for attachment to the earth-boring bit and a top portion for contacting an earthen formation to be drilled. The top portion includes a substrate and a layer of superhard material over a portion of the substrate other than in central region of the outer lateral face. For example, a layer of polycrystalline diamond is provided in the leading transition of the top portion, whereas the trailing transition and the central region of the outer lateral face of the top portion are substantially free of polycrystalline diamond.

66 Claims, 17 Drawing Sheets

CUTTING
MOVEMENT

CUTTING
MOVEMENT

CUTTING
MOVEMENT bisecting plane

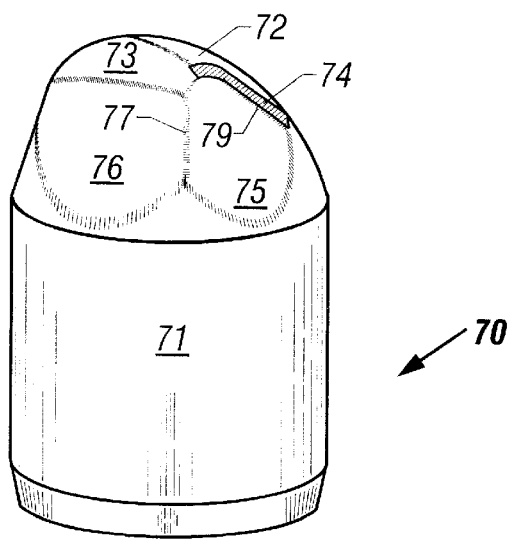
FIG. 7A
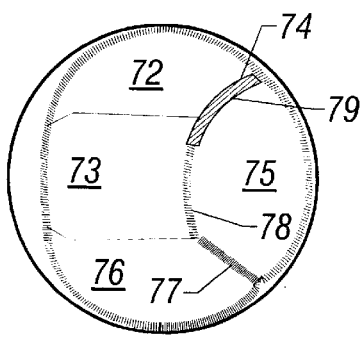
FIG. 7B
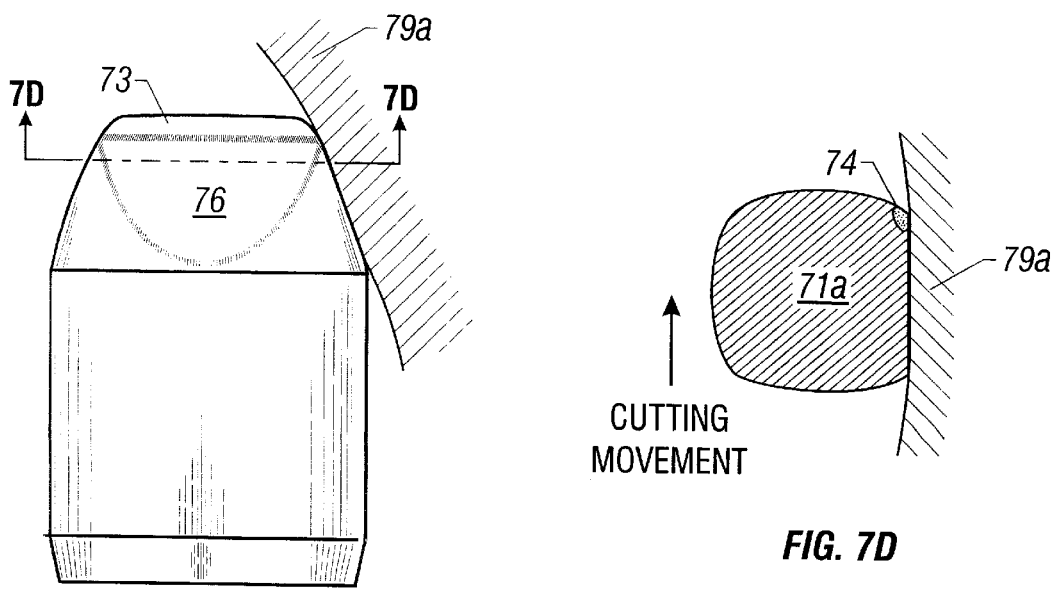
FIG. 7C
FIG. 7D

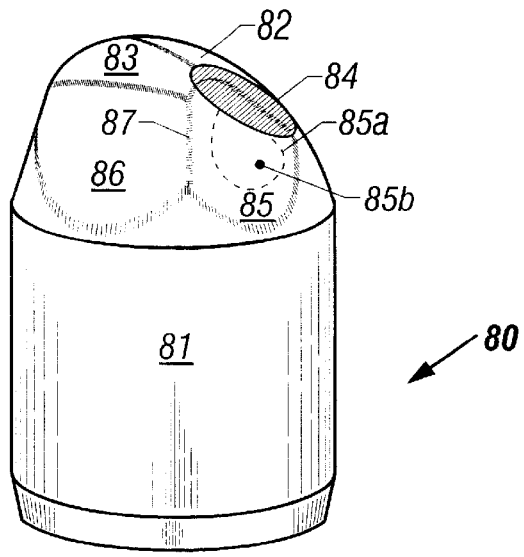
FIG. 8A
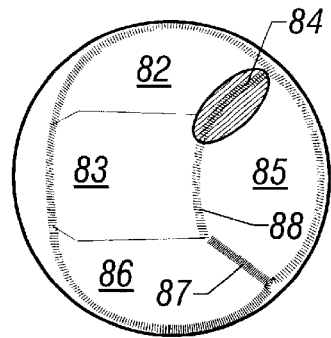
FIG. 8B
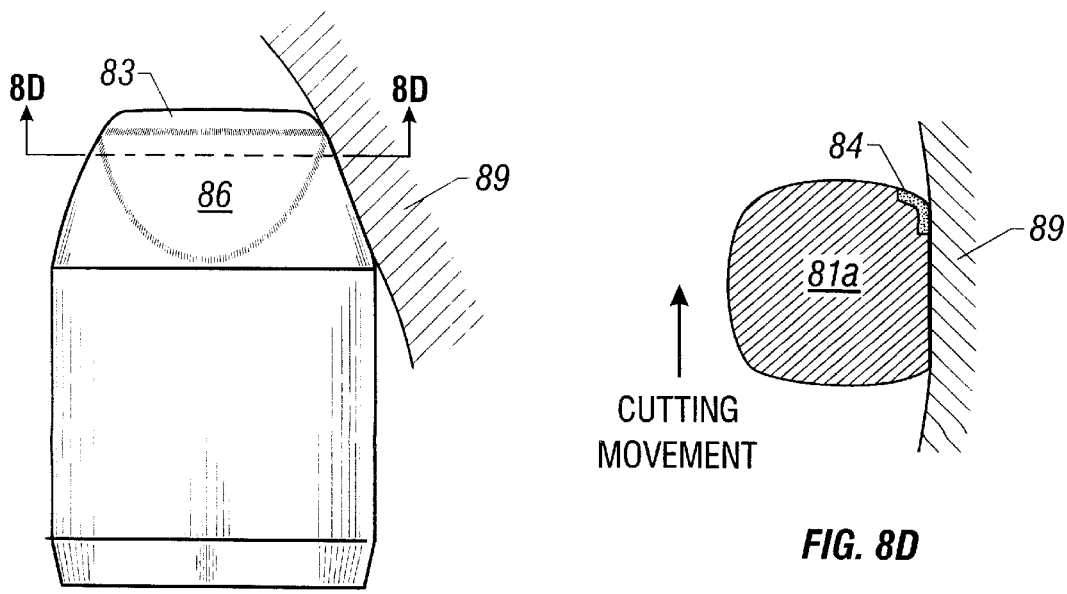
FIG. 8C
FIG. 8D

SUPERHARD MATERIAL ENHANCED INSERTS FOR EARTH-BORING BITS

FIELD OF THE INVENTION

This invention relates to earth-boring bits with superhard material enhanced inserts for drilling blast holes, oil and gas wells, and the like.

BACKGROUND OF THE INVENTION

Earth-boring bits, such as roller cone rock bits, are employed for drilling oil wells through rock formations, or for drilling blast holes for blasting in mines and construction projects. Earth-boring bits are also referred to as drill bits. During operation, a drill bit is connected to a drill string at one end and typically has a plurality of wear-resistant inserts imbedded in roller cones attached to a bit body at the other end. An insert usually has a substantially cylindrical body portion which is adapted to fit in an insert hole and a top portion which protrudes from the insert hole for contacting an earthen formation.

When a roller cone rock bit is used to drill a borehole, it is important that the diameter or gage of the borehole be maintained at a desired value. The first outermost row of inserts of each roller cone of a rock bit that cuts to a full gage borehole and the corner of borehole is referred to as the gage row. This row of inserts is generally subjected to the greatest wear as it reams the borehole wall and cuts the corner of the borehole. As the gage row inserts wear, the diameter of the borehole being drilled may decrease below the original gage diameter of the rock bit. When the bit is worn out and removed, a portion of the hole usually is under-gage. When the next bit is run in the hole, it is therefore necessary to ream that portion of the hole to bring it to the full gage. This not only takes substantial time but also commences wear on the gage row inserts of the newly inserted bit.

In addition to gage row inserts, a conventional bit typically includes a number of inner row inserts located on a roller cone and disposed radially inward from the gage row. These inner row inserts are sized and configured for cutting the bottom of the borehole. Sometimes, a conventional bit also may include a plurality of secondary inserts located between the gage row inserts. These inserts, referred to as "nestled gage inserts," typically cut the full gage of the borehole and also assist the gage inserts in cutting the borehole corner. Because a borehole primarily is cut by the collective action of the gage row inserts, nestled gage inserts (if therein), and inner row inserts, they are considered as the main cutting inserts of a rock bit.

In contrast, a conventional rock bit may include a row of heel inserts located on the frustoconical surface of a roller cone. The heel row inserts generally scrape and ream the side wall of a borehole as the roller cone rotates about its rotational axis. As such, the heel row inserts are not considered as the main cutting inserts; rather, they are deemed as auxiliary cutting inserts.

Due to the different functions performed by the primary and auxiliary cutting inserts, the two types of inserts experience different loading conditions during use. Thus, their impact of the performance and lifetime of a rock bit is different. Generally, the main cutting inserts have far more significant influence than the auxiliary cutting inserts.

The performance of a rock bit is measured, in part, by total drilling footage and rate of penetration. As the main cutting inserts on a rock bit wear, the rate of penetration decreases. When the main cutting inserts have been substantially worn out, it is no longer economical to continue drilling with such a rock bit. At this time, the rock bit must be replaced by a new one. The amount of time required to make a round trip for replacing a bit is essentially lost from drilling operations. This time can become a significant portion of the total time for completing a well. Therefore, constant efforts have been made to manufacture main cutting inserts that would increase the rate of penetration and total drilling footage of a rock bit. In particular, there have been numerous attempts to reduce wear and breakage and increase the cutting efficiency of the main cutting inserts.

Cemented carbide, such as tungsten carbide dispersed in a cobalt matrix, has been used to manufacture inserts for rock bits. Such tungsten carbide inserts (TCIs) possess good wear resistance and toughness to cut a borehole by crushing and gouging a rock formation. To improve the cutting efficiency of a tungsten carbide insert, a piece of polycrystalline diamond ("PCD") has been applied to a certain part of the top portion of the insert.

Although polycrystalline diamond is extremely hard and wear resistant, a polycrystalline diamond piece on a tungsten carbide insert may still fail during normal operation. The typical failure mode is cracking of the polycrystalline diamond due to high contact stress, lack of toughness, and insufficient fatigue strength. Once the polycrystalline diamond piece fails, the polycrystalline diamond cutting edge is essentially lost.

For the foregoing reasons, there exists a need for a superhard material enhanced main cutting insert that has the following attributes: (1) the insert has a cutting edge formed of superhard material; and (2) the superhard material is placed on the insert such that it does not fail prematurely.

SUMMARY OF THE INVENTION

The invention meets the aforementioned need by one or more of the following aspects. In one aspect, the invention relates to a main cutting insert for an earth-boring bit. The main cutting insert comprise (1) a body portion adaptable for being secured in the earth-boring bit; (2) a top portion that has a substrate and includes a leading transition and a trailing transition; and (3) a layer of superhard material provided over the substrate forming the leading transition. The substrate forming the trailing transition is substantially free of superhard material. Preferably, the top portion includes an outer lateral face, and the central region of the outer lateral face also is free of superhard material. In some embodiments, the layer of superhard material forms a cutting edge. The cutting edge may be sharp, chamfered, radiused, planar, or non-planar. The layer of superhard material may be recessed in, be flush with, or protrude from the substrate. The superhard material may includes diamond and cubic boron nitride. Such main cutting inserts may be used as a gage insert, off-gage insert, nestled gage insert, and inner row insert on a rock bit.

In another aspect, the invention relates to a main cutting insert for an earth-boring bit. The main cutting insert includes (1) a body portion adaptable for being secured in the earth-boring bit; (2) a top portion for extending from the earth-boring bit that includes an outer lateral face with a peripheral region and a central region; and (3) a layer of superhard material provided over a portion of the substrate in the peripheral region, but not over the substrate in the central region of the outer lateral face. Furthermore, the outer lateral face may include a centroid that is free of superhard material. The top portion may further include a leading edge in the peripheral region with the layer of superhard material.

In still another aspect, the invention relates to a rock bit for drilling a borehole. The rock bit includes (1) a bit body; (2) a roller cone rotatably mounted on the bit body; (3) a plurality of main cutting inserts located on the roller cone to cut at least a portion of a borehole corner or a borehole bottom. At least one insert includes (a) a body portion secured in the roller cone; (b) a top portion extending from the roller cone that has a substrate and includes a leading transition and a trailing transition; and (c) a layer of superhard material provided over the substrate forming the leading transition. The substrate forming the trailing transition is substantially free of superhard material.

In yet another aspect, the invention relates to a rock bit for drilling a borehole. The rock bit includes (1) a bit body; (2) a roller cone rotatably mounted on the bit body; (3) a plurality of main cutting inserts located on the roller cone to cut at least a portion of a borehole corner or a borehole bottom. At least one insert includes (a) a body portion secured in the roller cone; (b) a top portion extending from the roller cone and having a substrate; and (c) a layer of superhard material provided over a portion of the substrate. The layer of superhard material has a leading cutting edge and a thickness portion immediately adjacent to the cutting edge. The thickness portion of the layer of superhard material trails the leading cutting edge when the rock bit with the main cutting insert is used to form a borehole.

In one aspect, the invention relates to a rock bit for drilling a borehole. The rock bit includes (1) a bit body; (2) a roller cone rotatably mounted on the bit body; (3) a plurality of main cutting inserts located on the roller cone to cut at least a portion of a borehole corner or a borehole bottom. At least one insert comprises (a) a body portion secured in the roller cone; (b) a top portion that includes an outer lateral face having a peripheral region and a central region; and (c) a layer of superhard material provided over a portion of the substrate. The layer of superhard material has a cutting edge and a thickness portion immediately adjacent to the cutting edge, and the thickness portion defines a surface. When the rock bit is used to form the borehole, the surface of the thickness portion is substantially parallel to the surface of the borehole as the cutting edge contacts the borehole.

In another aspect, the invention relates to a rock bit for drilling a borehole. The rock bit includes (1) a bit body; (2) a roller cone rotatably mounted on the bit body; (3) a plurality of main cutting inserts located on the roller cone to cut at least a portion of a borehole corner or a borehole bottom. At least one insert comprises (a) a body portion secured in the roller cone; (b) a top portion that includes an outer lateral face with a peripheral region and a central region; and (c) a layer of superhard material provided over a portion of the substrate in the peripheral region, but not over the substrate in the central region of the outer lateral face.

In still another aspect, the invention relates to a rock bit for drilling a borehole. The rock bit includes (1) a bit body having a leg; (2) a roller cone rotatably mounted on the leg; (3) a plurality of main cutting inserts located on a row of the roller cone to cut at least a portion of a borehole corner or a borehole bottom. Each insert comprises (a) a substantially cylindrical body portion secured in the roller cone; (b) a top portion that includes a cemented tungsten carbide substrate and has an outer surface having an outer lateral face, a leading face, a leading edge, a crest, a trailing face, and a trailing edge, and (c) a continuous layer of polycrystalline diamond provided over the substrate forming the leading edge and a portion of the leading face. But the substrate forming the outer lateral face, the trailing edge, and the trailing face is substantially free of superhard material.

In yet another aspect, the invention relates to a method of manufacturing a main cutting insert. The method includes (a) providing a main cutting insert having a body portion and a top portion, the top portion including a substrate and having a leading transition and trailing transition; and (b) forming a layer of superhard material over the substrate in the leading transition, but not over the substrate in the trailing transition.

In still yet another aspect, the invention relates to a method of manufacturing a main cutting insert. The method includes (a) providing a main cutting insert having a body portion and a top portion, the top portion including a substrate; and (b) forming a layer of superhard material over the substrate, the layer of superhard material having a leading cutting edge and a thickness portion immediately adjacent to the leading cutting edge. The thickness portion of the layer of superhard material trials the leading cutting edge when the main cutting insert is used to form a borehole.

In one aspect, the invention relates to a method of manufacturing a main cutting insert. The method includes (a) providing a main cutting insert having a body portion and a top portion, the top portion including an outer lateral face having a peripheral region and a central region; and (b) forming a layer of superhard material over the substrate in the peripheral region, but not over the substrate in the central region of the lateral face.

In another aspect, the invention relates to a method of manufacturing a rock bit. The method includes (a) providing a main cutting insert having a body portion and a top portion, the top portion including a substrate and having a leading transition and a trailing transition; (b) forming a layer of superhard material over the substrate in the leading transition, but not over the substrate in the trailing transition; (c) securing the body portion of the main cutting insert having the layer of superhard material in a roller cone at a location to cut the corner or bottom of a borehole; and (d) rotatably mounting the roller cone on a bit body. The layer of superhard material may be formed under a high-pressure and high-temperature sintering condition. A high-shear compaction tape or a composite construction material may be used to form the layer of superhard material.

In still aspect, the invention relates to a method of manufacturing a rock bit. The method includes (a) providing a main cutting insert having a body portion and a top portion, the top portion including a substrate; (b) forming a layer of superhard material over a portion of the substrate, the layer of superhard material having a cutting edge and a thickness portion immediately adjacent to the cutting edge; (c) securing the body portion of the main cutting insert having the layer of superhard material in a roller cone at a location to cut the corner or bottom of a borehole; and (d) rotatably mounting the roller cone on a bit body. The thickness portion of the layer of superhard material trails the leading cutting edge when the rock bit having the main cutting insert is used to form a borehole.

In yet aspect, the invention relates to a method of manufacturing a rock bit. The method includes (a) providing a main cutting insert having a body portion and a top portion, the top portion including an outer lateral face having a central region and a peripheral region; (b) forming a layer of superhard material over the substrate in peripheral region, but not over the substrate in the central region of the outer lateral face; (c) securing the body portion of the main cutting insert having the layer of superhard material in a roller cone at a location to cut the corner or bottom of a borehole; and (d) rotatably mounting the roller cone on a bit body.

DESCRIPTION OF THE DRAWINGS

FIG. 7A is a perspective view of an insert in accordance with one embodiment of the invention.

FIG. 7B is a top view of the insert of FIG. 7A.

FIG. 7C is a schematic of the insert of FIG. 7A in contact with a rock formation.

FIG. 7D is a top sectional view of the insert of FIG. 7C taken along the line 7D—7D.

FIG. 8A is a perspective view of yet another embodiment of an enhanced insert according to the invention.

FIG. 8B is a top view of the insert of FIG. 8A.

FIG. 8C is a schematic of the insert of FIG. 8A in contact with a rock formation.

FIG. 8D is a top sectional view of the insert of FIG. 8C taken along the line 8D—8D.

DETAILED DESCRIPTION OF THE PREFERRED EMBODIMENTS

Embodiments of the invention provide superhard material enhanced main cutting inserts (hereinafter "enhanced inserts") for an earth-boring bit. The enhanced insert includes a body portion adapted for attachment to the earth-boring bit and a top portion for contacting an earthen formation to be drilled. The top portion includes a substrate and a layer of superhard material over the substrate in the leading transition; but a substantial portion of the substrate in the trailing transition of the top portion is free of superhard material. A portion of the substrate in the outer lateral face of the top portion also may be free of superhard material.

Figure 3:
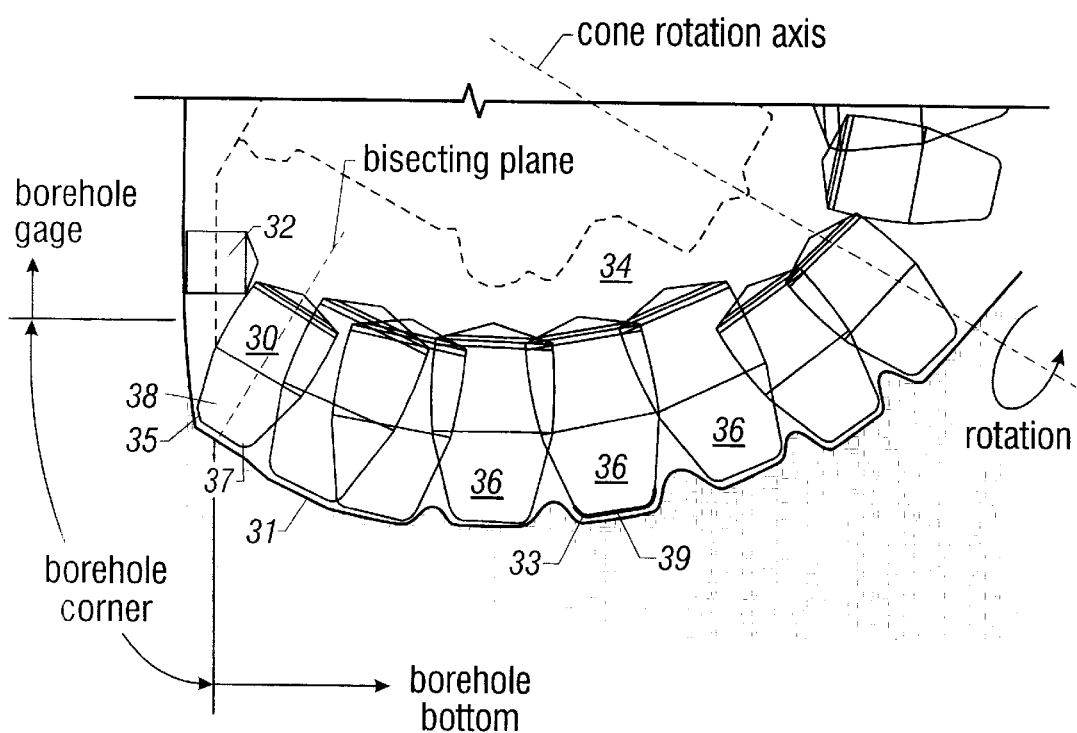
FIG. 3 is an overlay of all three roller cones of a rock bit and their respective inserts rotated into the same plane in a borehole.

The term "main cutting insert" refers to the insert that cuts at least a portion of a borehole corner or a borehole bottom (see FIG. 3). It should be understood that "cutting" or "cut" used herein includes any mechanical action that chips, crushes, gouges, shears, breaks, or separates an earthen formation. Generally, main cutting inserts includes gage row inserts, off-gage inserts (which are located slightly off a gage row on a roller cone), nestled gage row inserts, inner row inserts, and so on. But main cutting inserts do not include heel row inserts which ream and scrape the sidewall of a borehole, but do not cut a borehole corner.

The body portion refers to the part of an insert that is secured in a roller cone, and the top portion generally refers to the part of the insert that protrudes from the surface of the roller cone after being secured therein. Generally speaking, the top portion of an insert has an outer surface (i.e., the entire surface of the top portion) that includes one or more of the following: a leading edge, a leading face, a trailing edge, a leading face, a crest, and an outer lateral face. Other faces, such as an outer end and an inner end, also may be present. The leading edge or face is defined as the area or face of the top portion of an insert on a rock bit that generally first contacts an earthen formation as the bit rotates. As such, the leading edge generally is the edge formed by the leading face and the outer lateral face. It also may include the edge formed by the outer lateral face and the crest under some circumstances The trailing edge or face is the area or face of the top portion opposite the leading edge or face. Therefore, the trailing edge generally contacts the formation last as the roller cone rotates.

Furthermore, portions of the leading face, the outer lateral face, the leading edge, and the outer edge collectively make up a leading transition. Similarly, portions of the trailing face, the outer lateral face, the trailing edge, and the outer end collectively make a trailing transition. The terms "leading transition" and "trailing transition" do not refer to any particularly delineated section of the top portion; rather, "leading transition" refers to the section of the top portion in which compressive stresses are mostly concentrated, whereas "trailing transition" refers to the region of the top portion in which tensile stresses are mostly concentrated. The precise size and position of the leading and trailing transition vary not only with bit design and insert design, but also with movement of the rolling cone. The terms "compression" and "tension" are meant to be understood in the context of the operation of the drill bit and insert itself.

The outer lateral face of an insert (illustrated in FIG. 3) herein refers to the area or surface that substantially contacts or parallels a borehole bottom or at least a portion of a borehole corner. The outer lateral surface also is referred to the "wear face" of an insert. The outer lateral face may be subject to wear during use; but it need not wear to any significant extent. Generally, the outer lateral face of a gage row insert, an off-gage insert or a nestled gage row insert is the gage contact face or the wear face (but does not include the crest), whereas the outer lateral face of an inner row insert is the crest.

Embodiments of the invention are based, in part, on the realization that the benefits of a polycrystalline diamond cutting edge on an insert may be better utilized if the polycrystalline diamond is placed in a region of the insert where it does not tend to crack or break off. It is found that different regions of an insert encounter different loading conditions and consequently, different stresses, i.e., tensile, compressive, fatigue, etc. For example, the leading transition generally is subject to high compressive stresses in the direction of cutting movement, whereas the trailing transition generally is subject to tremendous tensile stresses in the direction of cutting movement. The outer lateral face experiences excessive friction and substantial compressive stresses. While polycrystalline diamond may withstand high compressive force due to its extreme hardness, tensile loading may be detrimental to the interface between polycrystalline diamond and a tungsten carbide substrate. As such, a polycrystalline diamond coating in the trailing transition tends to crack and break off. Consequently, it may be more desirable to provide polycrystalline diamond in the leading transition, but not in the trailing transition.

Figure 1A:
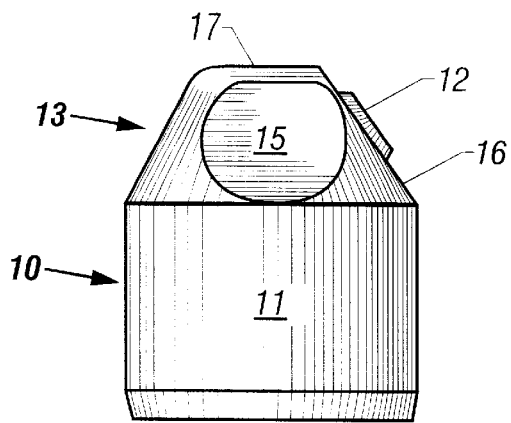
FIG. 1A is a perspective view of a prior art tungsten carbide insert with a polycrystalline diamond compact in the outer lateral face of the top portion of the insert.
Figure 1B:
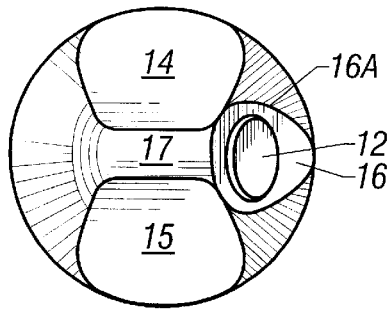
FIG. 1B is a top view of the insert of FIG. 1A.

FIG. 1A shows a perspective view of a prior art PCD enhanced insert, and FIG. 1B is a top view of the prior art PCD insert. The insert 10 includes a cylindrical body portion 11 and a top portion 13. A piece of polycrystalline diamond (i.e., a polycrystalline diamond compact) 12 is placed in the outer lateral face 16 of the top portion 13. The top portion 13 also includes a leading face 14, a trailing face 15, and a crest 17 which are free of polycrystalline diamond.

Figure 1C:
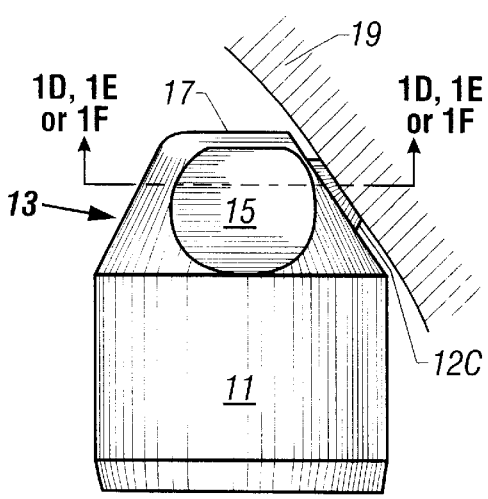
FIG. 1C is a schematic of the insert of FIG. 1A in contact with a rock formation.
Figure 1D:
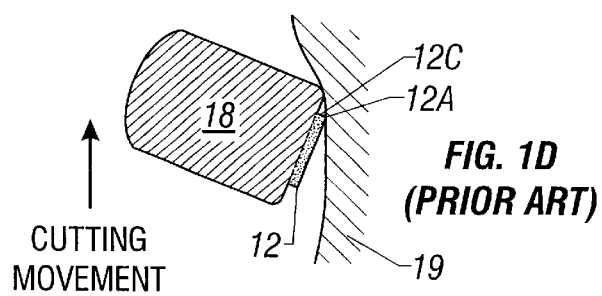
FIG. 1D is a top sectional view of the insert of FIG. 1C (taken along the line 1D—1D) at the initial stage of contacting an earthen formation.
Figure 1E:
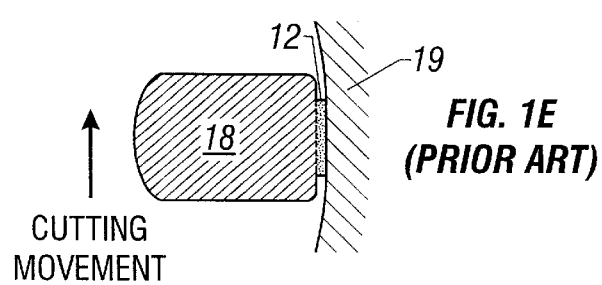
FIG. 1E is a top sectional view of the insert of FIG. 1C (taken along the line 1E—1E) at the middle stage of contacting an earthen formation.
Figure 1F:
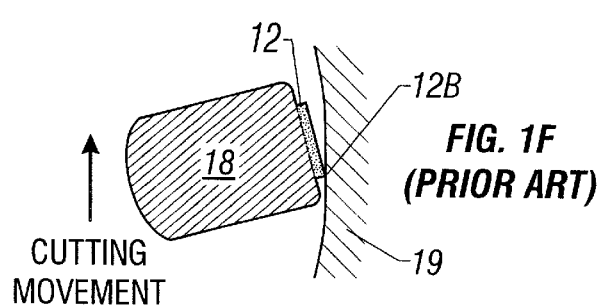
FIG. 1F is a top sectional view of the insert of FIG. 1C (taken along the line 1F—1F) at the last stage of contacting an earthen formation.

As illustrated in FIG. 1C, when the insert 10 is used as a main cutting insert, e.g., a gage insert, on a roller cone bit, the outer lateral face 16 with a polycrystalline diamond compact 12 substantially contacts the corner of a borehole and cuts the corner by crushing, chipping, and shearing the formation 19. FIGS. 1D–1F show top sectional views of the insert 10 in contact with the formation 19 at various stages of contact. FIG. 1D illustrates the initial stage of the contact (the angle of contact may be exaggerated in this figure). At this point, the insert 10 may contact the formation 19 at the carbide substrate leading edge 16A, the polycrystalline diamond thickness portion 12C, and the polycrystalline cutting edge 12A. The diamond edge 12A shears the formation 19 as it moves in the direction of cutting movement. FIG. 1E depicts full contact of the polycrystalline diamond compact 12 with the formation 19. At this point, the diamond compact 12 is under tremendous compressive stresses and shearing stresses opposite to the direction of cutting movement. FIG. 1F shows the contact of the insert with the formation 19 as it leaves the formation 19.

It can be seen in FIG. 1D that, as the insert 10 cuts the formation 19 in the direction of cutting movement, both the polycrystalline diamond compact 12 and the tungsten carbide substrate 18 beneath it can contact the formation 19. Because tungsten carbide is less wear resistant than polycrystalline diamond, it tends to wear away faster. This leads to undesirable wear of the tungsten carbide substrate 18 beneath the polycrystalline diamond compact 12. Because the diamond compact 12 is under large compressive stresses, it may crack and break off after the underlying supporting material is worn away. The shearing stress exerted on the diamond compact 12 in the opposite direction of the cutting movement tends to weaken the interface between the diamond compact 12 and the tungsten carbide substrate 18. Furthermore, as shown in FIG. 1F, the diamond compact 12 also may extend to the trailing transition 12B which is under large tensile stresses in the direction of the cutting movement. These tensile stresses can lead to breakage of the diamond compact. It should be understood that the views illustrated in FIGS. 1D–1F are merely schematics and do not necessarily represent the cutter path from a uniform perspective. They represent different segments of the cutter path arranged so as to best illustrate the concepts related to compressive and tensile stresses relative to the direction of the cutting movement.

As mentioned above, the stresses generated in each insert during a cutting cycle are not equal across the body of the insert. Specifically, each insert has one portion that is subjected to primarily compressive stress in the direction of cutting movement and another portion that is subjected to primarily tensile stress in the direction of cutting movement. It is often the case that the leading transition of an insert is the portion subject to the greatest compressive stress, whereas the trailing transition of the insert is the portion subject to the greatest tensile stress.

It has been found that the trailing transition generally is subject to earlier failure than the leading transition. It is believed that the premature failure of the trailing transition and ultimately the entire insert may be the result of excessive friction along the trailing transition and the resultant tensile stress in the direction of cutting movement. Unlike the leading transition, the trailing transition generally does not engage in shearing or reaming a borehole corner or bottom, and it is not subject to large compressive stresses in the direction of cutting movement. Therefore, any superhard coating in the trailing transition may be adversely affected by tensile stress, thereby causing chipping, crack formation, and breakage. When a layer of superhard material is provided only in the leading transition, chipping and breakage of polycrystalline diamond may be minimized. Further, the layer of superhard material in the leading transition provides the needed shearing action which should enhanced the cutting efficiency.

Therefore, the enhanced inserts in accordance with embodiments of the invention include superhard material in the leading transition, but not in the trailing transition of the top portion. Furthermore, it is preferred that a substantial portion of the outer lateral face also is not provided with superhard material. This design allows renewal of cutting edges in the leading transition as the superhard material and the substrate wear in a controlled manner. The controlled wear also may allow the cutting edges to form an optimal geometrical shape as to conform to the formation to be drilled. Such inserts retain the benefits of a cutting edge formed by superhard material, while minimizing the undesirable aspects associated with use of superhard material. Consequently, they should have increased cutting efficiency and longer lifetime.

To exemplify the above concept, FIGS. 2A–2F show a gage row insert according to one embodiment of the invention. The term "gage row insert" or "gage insert" herein refers to any insert that cuts a portion of the corner of a borehole. It includes a gage insert, an off-gage insert, a nestled gage insert, etc. Accordingly, the term "gage row" refers to the position on a roller cone that includes the gage insert defined herein.

Figure 2A:
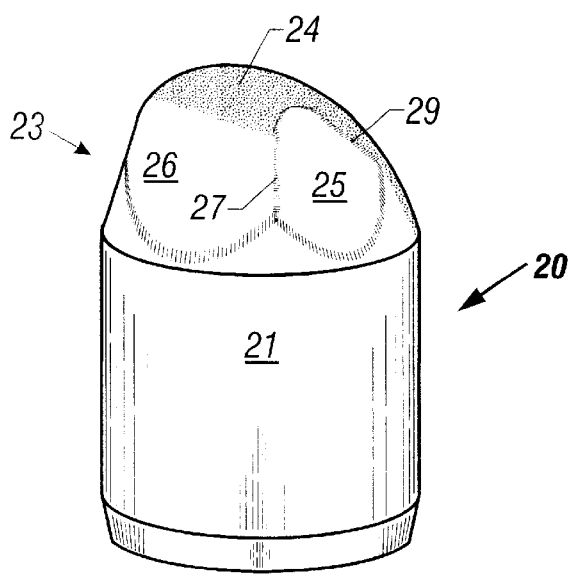
FIG. 2A is a perspective view of a polycrystalline diamond enhanced insert according to one embodiment of the invention.
Figure 2B:
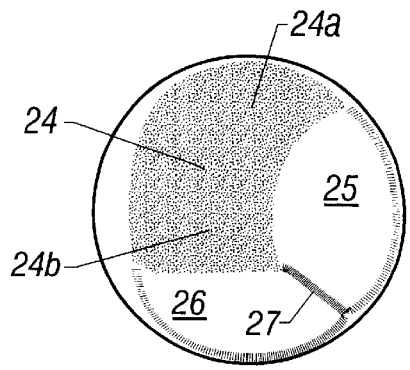
FIG. 2B is a top view of the insert of FIG. 2A.

Referring to FIG. 2A and 2B, an enhanced insert 20 includes a body portion 21 adapted for attachment to an earth-boring bit and a top portion 23 for contacting an earthen formation to be drilled. The top portion 23 includes an outer lateral face 25 which is free of any superhard material and a layer of polycrystalline diamond 24 along the leading edge 29 and on the leading face 24a and the crest 24b. The trailing transition of the top portion also is substantially free of any superhard material. In this embodiment, the entire outer lateral face is not provided with superhard material. However, in other embodiments, a layer of superhard material in the leading transition may extend to the periphery of the outer lateral face.

Figure 2D:
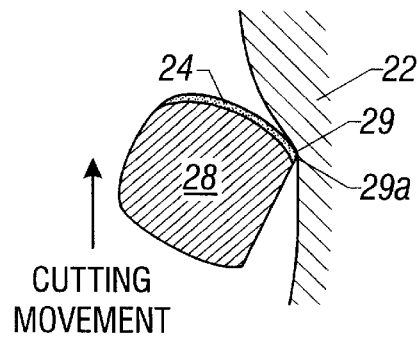
FIG. 2D is a top sectional view of the insert of FIG. 2C (taken along the line 2D—2D) at the initial stage of contacting an earthen formation.
Figure 2C:
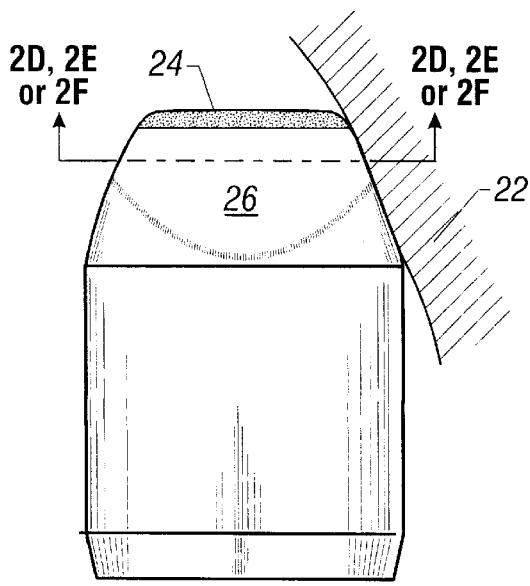
FIG. 2C is a schematic of the insert of FIG. 2A in contact with a rock formation.
Figure 2E:
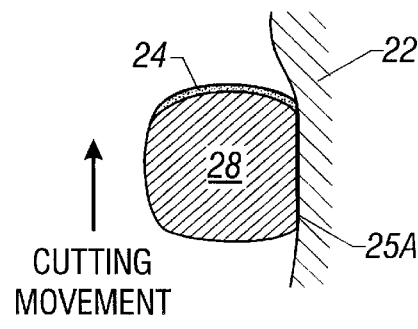
FIG. 2E is a top sectional view of the insert of FIG. 2C (taken along the line 2E—2E) at the middle stage of contacting an earthen formation.
Figure 2F:
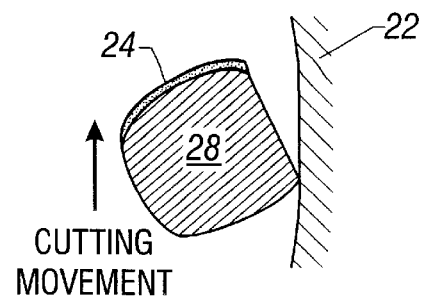
FIG. 2F is a top sectional view of the insert of FIG. 2C (taken along the line 2F—2F) at the last stage of contacting an earthen formation.

When this insert is used to cut the corner of a borehole as illustrated in FIG. 2C, the polycrystalline diamond contacts the formation 22 in the leading transition. Furthermore, a diamond leading cutting edge 29 of FIG. 2A is formed around the leading transition. FIGS. 2D–2F show three stages of contact between the insert 20 and the formation 22. FIG. 2D shows the initial contact. The angle of contact may be exaggerated for illustration purposes. At this point, the leading transition (which is provided with a layer of polycrystalline diamond) contacts the formation 22. The diamond leading cutting edge 29 shears the formation 22 in the direction of the cutting movement. At this point, the surface formed by the thickness portion 29a of the polycrystalline diamond 24 is substantially parallel to the surface of the formation 22. This is in contrast to the prior art insert 10 of FIG. 1D in which the surface of the thickness portion 12C is substantially perpendicular to the surface of the formation 19. After the diamond leading cutting edge 29 contacts the formation 22, the thickness portion 29a of the polycrystalline diamond 24 contacts the formation. In other words, the thickness portion of the polycrystalline diamond 29a trails the diamond leading cutting edge 29. This is opposite to the prior art insert 10 of FIG. 1D where the thickness portion 12C either leads the diamond cutting edge 12A or contacts the formation 19 at the same time as the diamond cutting edge 12A.

When the outer lateral face 25 comes in full contact with the formation 22 as illustrated in FIG. 2E, the layer of polycrystalline diamond 24 is not under tremendous compressive stresses; nor is the interface between the diamond layer 24 and the tungsten carbide substrate 28 subject to high shearing stresses. As the insert 20 leaves the formation shown in FIG. 2F, only the carbide substrate in the trailing transition of the insert 20 contacts the formation and experiences tensile stresses. Because no diamond is provided in the trailing transition, the tensile stresses do not substantially cause breakage of the diamond layer 24. Furthermore, because tungsten carbide generally is tougher than diamond, it can better withstand the tensile stress in the trailing transition. Consequently, such inserts should have increase cutting efficiency due to the presence of a diamond cutting edge. They also should have a long lifetime because of the advantageous location of the diamond layer.

FIG. 3 illustrates the concept of "outer lateral face" of a main cutting insert. It is an overlay of all three roller cones of a rock bit and their respective inserts rotated into the same plane and shows a cross-sectional view of a roller cone and the side wall of a borehole. Referring to FIG. 3, the roller cones collectively indicated as 34 includes a heel row insert 32, a gage row insert 30, and a plurality of inner row inserts 36.

As the roller cone rotates around the cone rotation axis, the gage row insert 30 comes in contact with the borehole corner, and the inner row inserts 36 contacts the borehole bottom. The formation at the borehole corner generally is cut by a combination of a shearing, chipping and crushing action of the gage row insert. The formation at the borehole bottom generally is cut by a gouging and crushing action of the inner row inserts 36. On the other hand, the heel row insert 32 contacts the borehole gage (i.e., the side wall of the borehole) after the borehole corner and side wall is cut and helps maintain a full gage borehole by scraping and reaming the side wall.

When the gage row insert 30 is in contact with the borehole corner, there exists a point or area of contact 35 between the insert 30 and the corner wall. The point or area of contact 35 herein is referred to as the "outer lateral face" for a gage or nestled gage row insert. This outer lateral face sometimes is referred to in the art as the "gage contact area." Generally, the insert 30 generally is divided into two portions: an outer portion 38 and an inner portion 37. The outer portion 38 is the portion of the insert that is closer to or in contact with the borehole corner. On the other hand, the inner portion 31 is the portion of the insert opposite the outer portion 38 divided by a bisecting plane as indicated. The outer lateral face typically lies in the outer portion 38 of the insert 30.

Inner row inserts 36 generally contacts the formation at the crest area (indicated by the boldface) 39 and the outer corner 33. Therefore, these areas are referred to as the outer lateral face of an inner row insert.

It should be recognized that an outer lateral face may be planar, non-planar, curved, concave, or convex. This surface may take any symmetrical and non-symmetrical shapes, including but not limited to circular, oval, elliptical, triangular, rectangular, and irregular shapes. The outer lateral face includes a periphery (or a peripheral region) and a central region. The periphery is the outermost region of an outer lateral face, i.e., it is the region of the outer lateral face that borders the leading edge, the crest, the trailing edge, and other faces. On the other hand, the central region is the region of the outer lateral face that substantially contacts an earthen formation. As such, the central region of the outer lateral face generally is situated at or near the center or middle point of the outer lateral face and generally should include the centroid of the outer lateral face. The shape of the central region may be substantially similar to the shape of the outer lateral face, except that it has a smaller area. In some embodiments, superhard material is provided over the substrate in the peripheral region with or without providing superhard material in the leading transition; in other embodiments, no superhard material is provided in the peripheral region. The size of the central region in relationship to the outer lateral face varies according to the insert and outer lateral face geometry, the application of the inserts, the wear resistance of the superhard material as well as other factors.

Figure 4A:
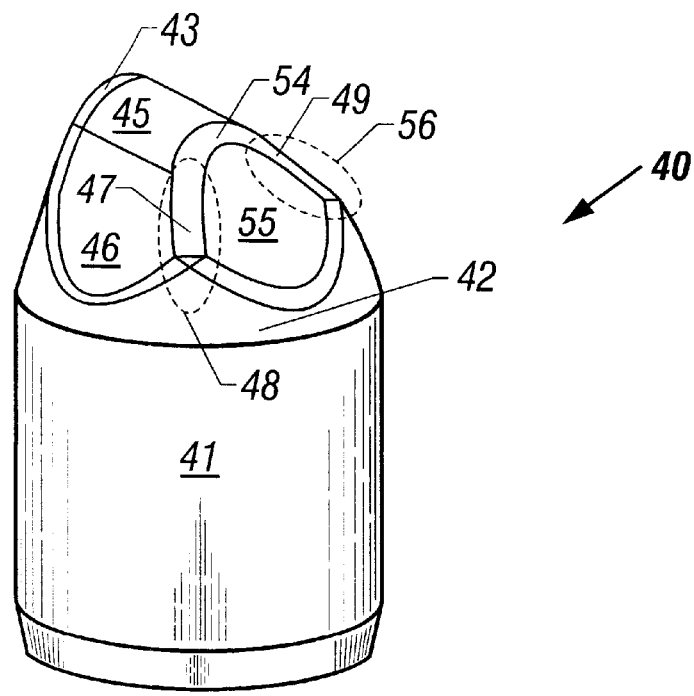
FIG. 4A is a perspective view of an insert showing various faces of the top portion of an insert.
Figure 4B:
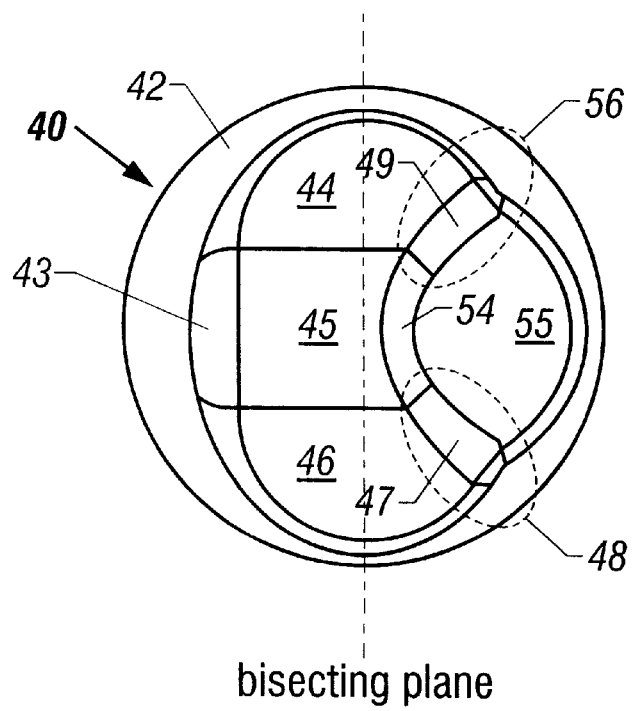
FIG. 4B is a top view of the insert of FIG. 4A.

For a known direction of bit rotation, the relative locations of the leading and trailing edges or faces may be determined. FIG. 4A and FIG. 4B illustrate the relative location of a leading face 44, a leading edge 49, a trailing face 46, a trailing edge 47, an outer lateral face 55, a crest 45, and an outer edge 54. Furthermore, portions of the leading face 44, the outer lateral face 55, the leading edge 49, and the outer edge 54 collectively make up a leading transition 56. Similarly, portions of the trailing face 46, the outer lateral face 55, the trailing edge 47, and the outer end 54 collectively make a trailing transition 48. It is noted that a leading transition or trailing transition may be planar, contoured, or include an edge.

Figure 5A:
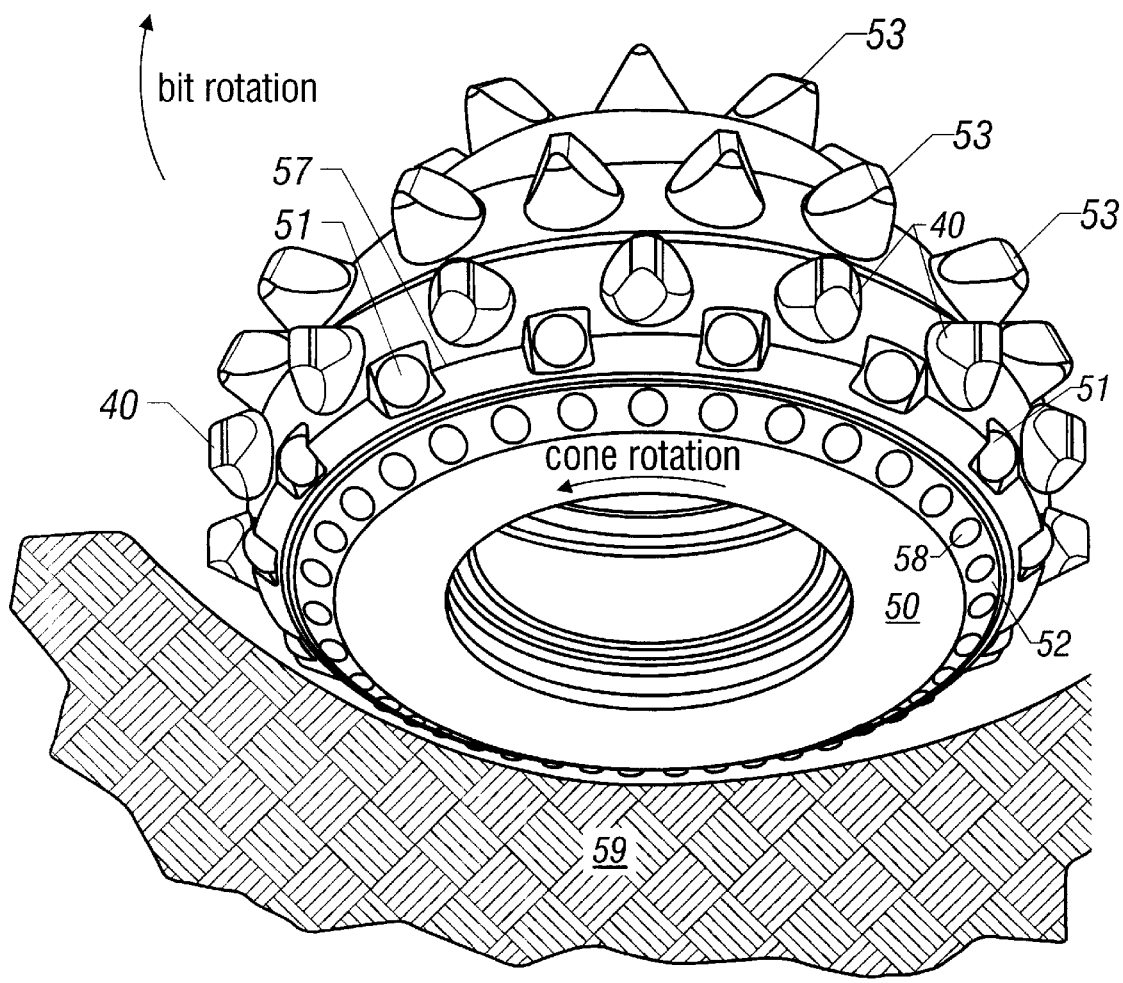
FIG. 5A is a perspective view of one roller cone of a rock bit in a borehole as viewed from the top of the borehole down to the bit while drilling.
Figure 5B:
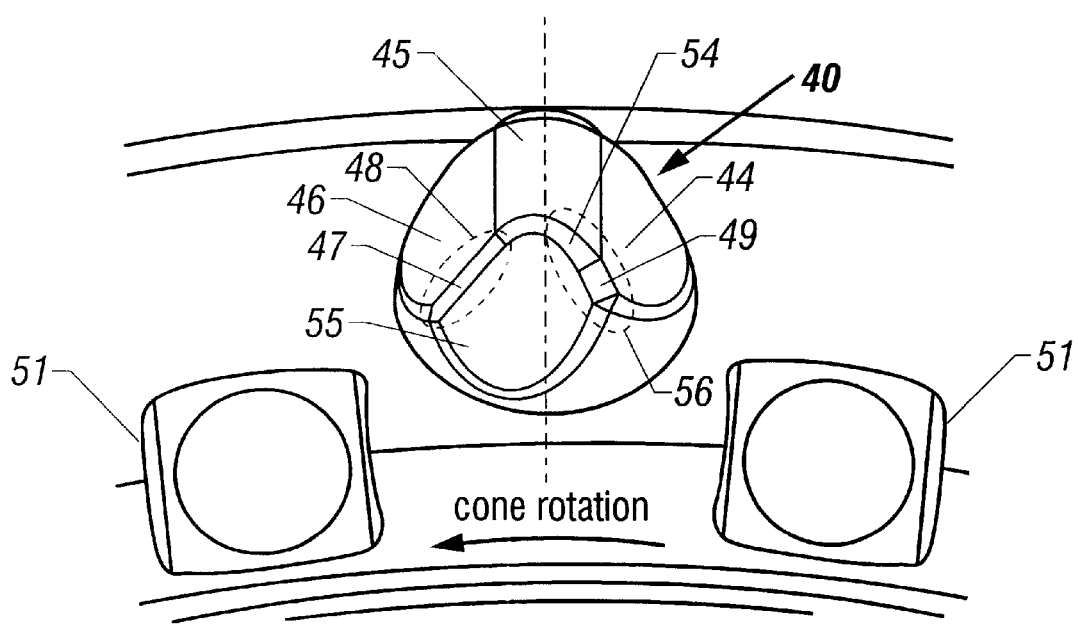
FIG. 5B is an enlarged view of the insert 40 of FIG. 5A showing the location of the leading edge, trailing edge, leading face, trailing face, and outer lateral face.

FIGS. 5A and 5B illustrate the concept of "leading" and "trailing." FIG. 5A is a perspective view of a roller cone of a rock bit in a borehole as viewed from the top of the borehole down to the bit while drilling. A roller cone 50 includes heel row inserts 58, off-gage row inserts 40, gage row inserts 51, and inner row inserts 53. It should be noted that FIG. 5A and FIG. 5B show a Trucut™ design of Smith International, Inc. in which off-gage inserts (with a chisel-shaped top portion) are used in conjunction with gage row inserts (with a semi-round top-portion) which are located on the gage row 57. It should be understood that the gage inserts 51 may be nestled gage inserts if the inserts 40 are positioned to cut the full gage of a borehole.

Figure 5C:
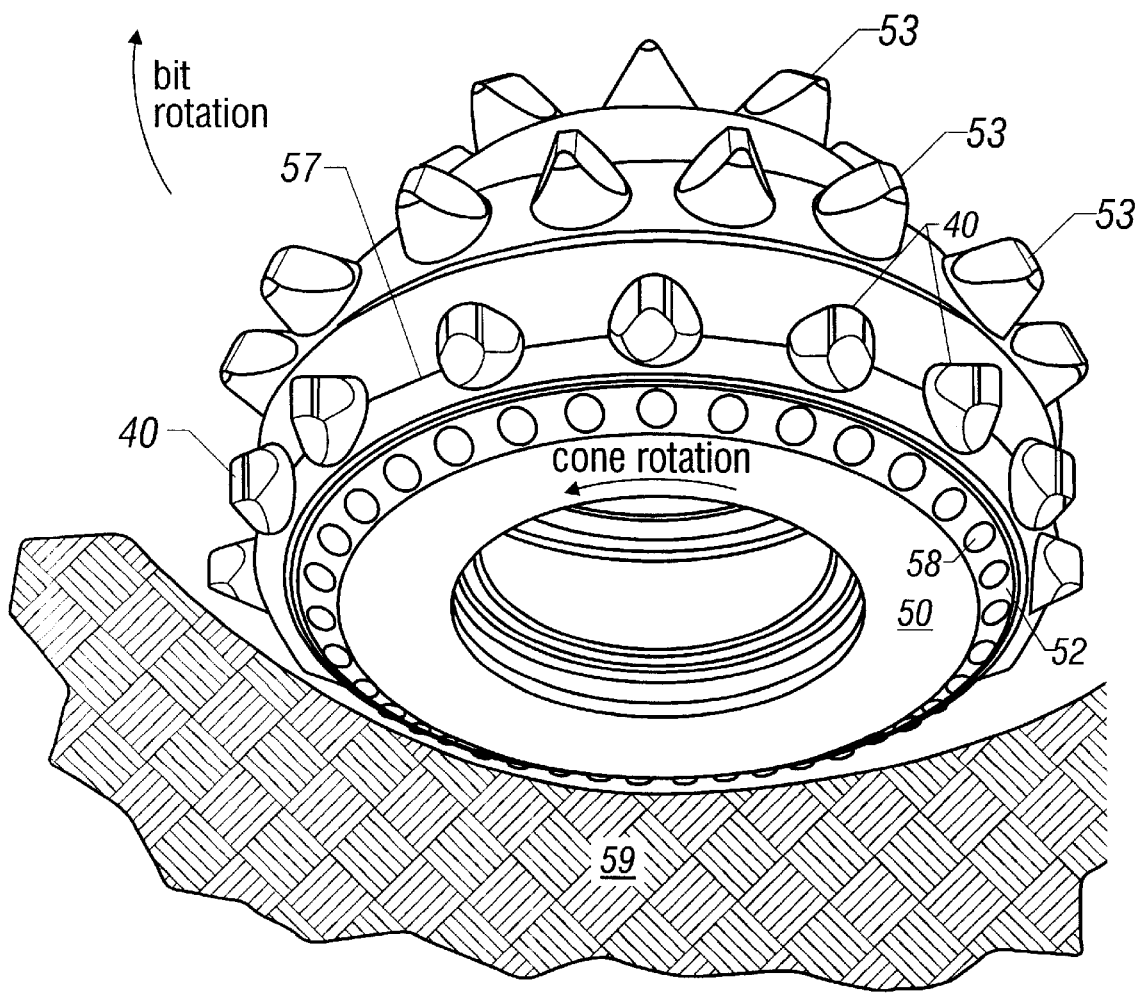
FIG. 5C is a perspective view of another roller cone of a rock bit in a borehole as viewed from the top of the borehole down to the bit while drilling.

It is apparent that the same "leading" and "trailing" concepts also apply to a conventional design as illustrate in FIG. 5C. In this conventional design, there are no off-gage inserts, and the gage inserts have a chisel-shaped top portion.

Referring to FIG. 5B, the insert 40 includes a leading edge 49, a leading face 44, a trailing edge 47, a trailing face 46, an outer lateral face 55, a crest 45, and an outer edge end 54. As the rock bit (not shown) rotates clockwise in a borehole, the roller cone 30 rotates counterclockwise. As such, the leading edge 49, the outer edge 54, and the leading face 44 contact the formation first or are subject to compressive loading, and the trailing edge 47 and the trailing face 46 contact the formation last or are subject to tensile loading. The leading transition 56 and trailing transition 48 correspond to the portions that are subject to compressive and tensile loading, respectively.

In embodiments of the invention, the body portion of an insert is substantially cylindrical, although any other shapes also are feasible. It is formed of a hard material, such as hard metals, hard ceramic materials, cermets. Preferably, carbides, nitrides and silicides are used. More preferably, cemented tungsten carbide is used. In preferred embodiments, the body portion is formed of the same material as the substrate forming the top portion. However, it is entirely feasible to manufacture inserts with the body portion and the substrate being formed of different materials.

The top portion may take various shapes, e.g., ballistic, conical, semi-round, symmetrical, asymmetrical, chisel-shaped, inclined chisel-shaped, etc. The substrate of the top portion may be formed of carbide, nitride, silicide and other suitable materials. Preferably, cemented tungsten carbide in a cobalt matrix is used as the material for the substrate.

Suitable superhard material includes diamond, boron nitride, and other materials with comparable hardness. Generally, superhard material has a hardness of at least 2,400 Vickers. Diamond may be either natural or synthetic. Polycrystalline diamond is one form of diamond that can be used in embodiments of the invention. The term "polycrystalline diamond" refers to the material produced by subjecting individual diamond crystals to sufficiently high pressure and high temperature that inter-crystalline bonding occurs between adjacent diamond crystals. Typically, polycrystalline diamond may include a metal selected from the group consisting of cobalt, nickel, iron, and alloys thereof. It may further include particles of carbide or carbonitride of elements selected from the group consisting of tungsten, titanium, tantalum, chromium, molybdenum, vanadium, hafnium, zirconium, and alloys thereof. Moreover, other compounds may also be included in polycrystalline diamond if desired. Although the term "polycrystalline diamond" is used to describe some embodiments, it should be understood that other superhard materials may be used in place of polycrystalline diamond.

FIGS. 6A–6G illustrate various embodiments that use a "shaped insert". Such shaped inserts are disclosed in pending U.S. patent application Ser. No. 08/879,872, entitled "Non-Symmetrical Stress-Resistant Rotary Drill Bit Cutter Element," filed Jun. 3, 1997. The disclosure of this application is incorporated by reference herein in its entirety. A shaped insert generally has its outer lateral face canted or relieved away from the borehole wall and in the direction of the trailing face so that the trailing transition experiences less friction, thereby increasing the insert lifetime.

Figure 6A:
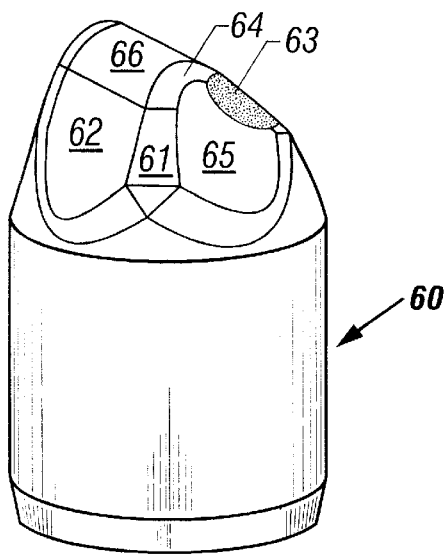
FIG. 6A is a perspective view of one embodiment of an enhanced insert having its outer lateral face relieved according to the invention.
Figure 6B:
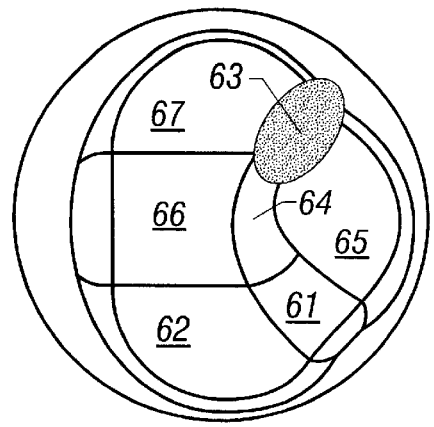
FIG. 6B is a top view of the insert of FIG. 6A.
Figure 6C:
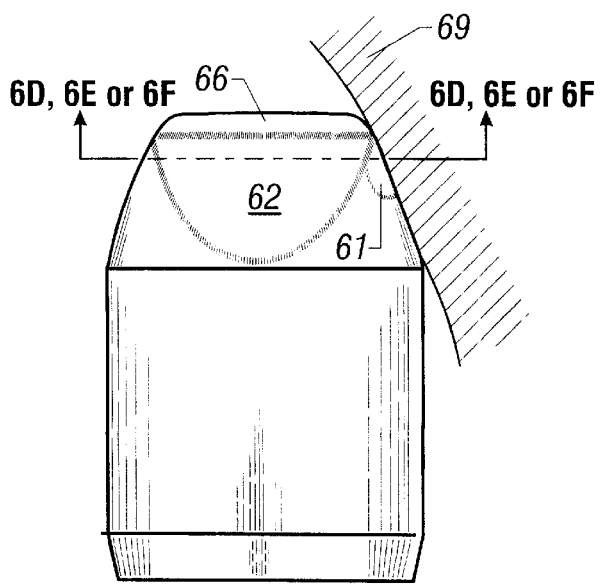
FIG. 6C is a schematic of the insert of FIG. 6A in contact with a rock formation.
Figure 6D:
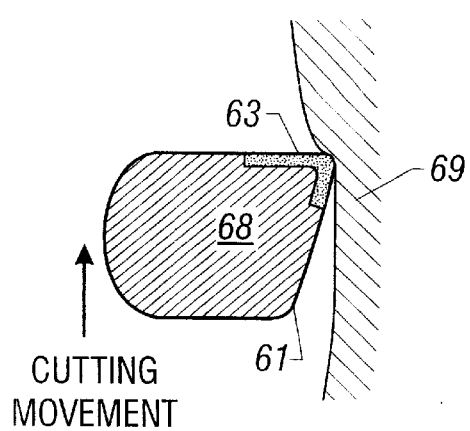
FIG. 6D is a top sectional view of the insert of FIG. 6C taken along the line 6D—6D.
Figure 6E:
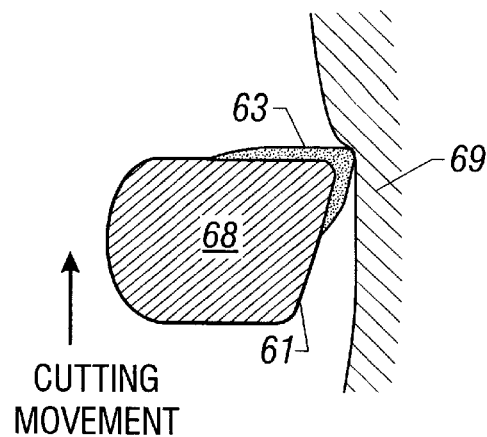
FIG. 6E is a top sectional view of an alternative embodiment of the insert of FIG. 6C taken along the line 6E—6E.

Referring to FIGS. 6A–6G, a shaped insert 60 has a relieved outer lateral face 65 that is canted away from the borehole wall 69. A layer of polycrystalline diamond 63 in provided only in the leading transition of the top portion, i.e., in a portion of the regions labeled as 67, 64, and 65. Preferably, the polycrystalline diamond layer 63 is flush with the surface of the tungsten carbide substrate 68 (as shown in FIG. 6D). Alternatively, the polycrystalline diamond layer may protrude over the surface of the tungsten carbide substrate 68 as shown in FIG. 6E. Under some circumstances, the polycrystalline diamond layer may be recessed in the tungsten carbide substrate.

Figure 6F:
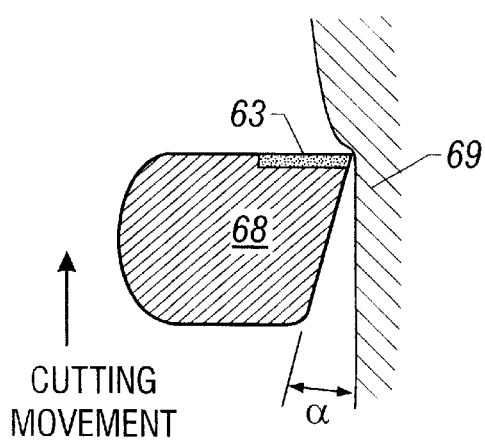
FIG. 6F is a top sectional view of still another embodiment of the insert of FIG. 6C taken along the line 6F—6F.

FIG. 6F illustrates still another embodiment using the shaped insert. In this embodiment, polycrystalline diamond is provided in the leading face and along the leading edge of the insert 60. The diamond edge and the diamond thickness portion are provided such that the entire polycrystalline diamond 63 and the substrate 68 form a back rake angle $\alpha$ with respect to the surface of the formation 69. This back rake angle in connection with the relieved (or canted) outer lateral face is preferred because it takes advantage of the diamond cutting edge but minimizes the impact of tensile loading in the trailing transition. Consequently, the insert should have better cutting efficiency and increased lifetime.

Figure 6G:
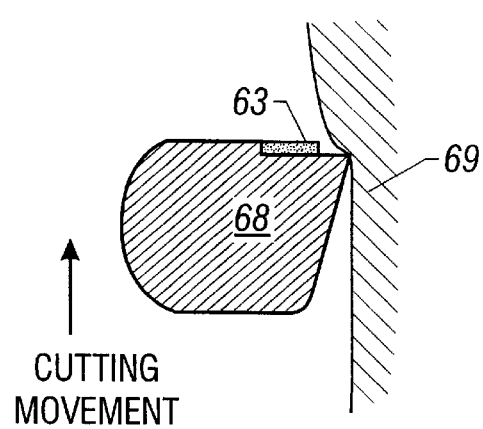
FIG. 6G shows a top section view of an alternative embodiment of the insert of FIG. 6F.

FIG. 6G shows a slight modification of the embodiment of FIG. 6F. In this embodiment, the polycrystalline diamond 63 is placed slightly away from the point of initial contact between the substrate 68 and the formation 69. The polycrystalline diamond 63 may contact the formation after the initial contact. As the substrate 68 wears, the polycrystalline diamond 63 may contact the formation at the initial contact point.

FIGS. 7A–7D illustrate yet another embodiment. In this embodiment, a regular insert 70 (as opposed to a shaped insert) is used. A strip of a polycrystalline diamond layer 74 is provided only in the area along the leading edge 79 (i.e., the transition of the regions labeled as 72, 73, and 75) of the top portion of the insert 70. Other regions of the top portion, such as the leading face 72, the crest 73, the trailing face 76, the trailing edge 77, and the outer lateral face 75, are not provided with a layer of polycrystalline diamond. Rather, the substrate material is exposed in these regions. While the leading edge 79 is shown to have a radius, it also may be planar, non-planar, or any other geometrical shapes. Moreover, the edge may be sharp or chamfered. Such a insert should have significantly high cutting efficiency. It should be understood that the polycrystalline diamond 74 may be provided over the substrate of other regions, e.g., the transition region formed by the outer lateral face 75 and the crest 73 or the transition region formed by the outer lateral face 75 and the leading face 72.

FIGS. 8A–8D illustrate yet still another embodiment. In this embodiment, a regular insert 80 (as opposed to a shaped insert) is used. A polycrystalline diamond layer 84 is provided in the leading transition, but not in the trailing transition. The polycrystalline diamond layer 84 extends to the periphery 85a of the outer lateral face 85. On the other hand, the central region (which includes the centroid 85b) of the outer lateral face 85 is not provide with a polycrystalline diamond layer.

Figure 9A:
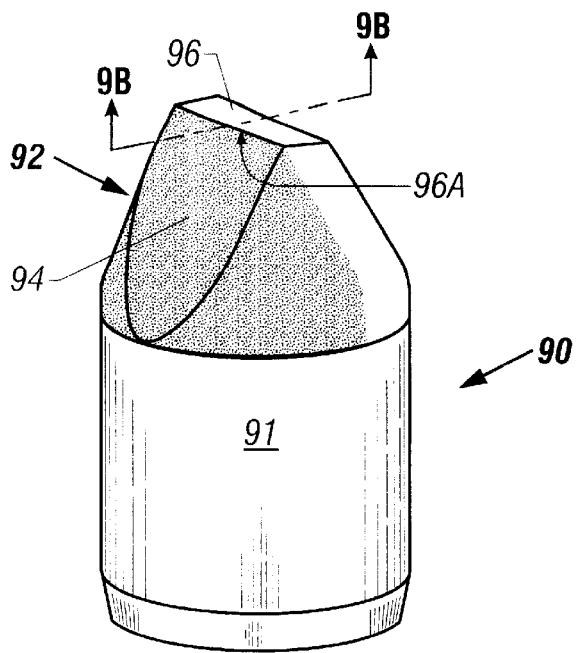
FIG. 9A is perspective view of an insert having a chisel-shaped top portion in accordance with one embodiment of the invention.
Figure 9B:
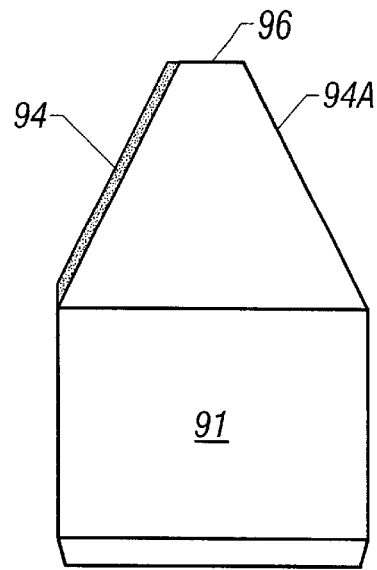
FIG. 9B is a side sectional view of the insert of FIG. 9A.
Figure 9C:
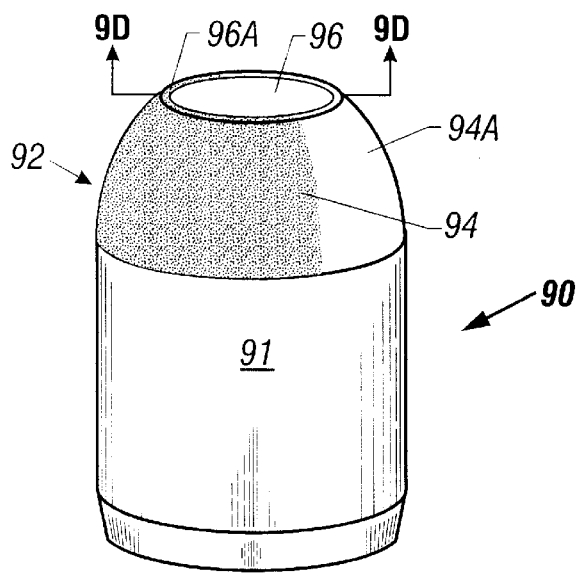
FIG. 9C is perspective view of an insert having a conical top portion in accordance with one embodiment of the invention.
Figure 9D:
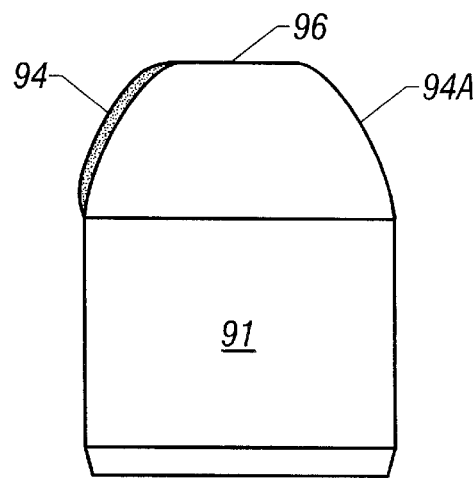
FIG. 9D is a side sectional view of the insert of FIG. 9C.

FIGS. 9A–9D shows enhanced inner row inserts in accordance with embodiments of the invention. Referring to FIG. 9A, an inner row insert 90 having a chisel-shaped top portion 92. The outer lateral face 96 is free of a polycrystalline diamond layer, whereas the leading transition 94 (the shaded area) is provided with a polycrystalline diamond layer. Furthermore, the trailing transition 94A is free of polycrystalline diamond. FIG. 9B is a side sectional view of the insert 90. Although a chisel-shaped top portion is shown, other shapes also are acceptable. They include, but are not limited to, semi-round shape, conical shape, and the shapes that typically are used in the gage row (such as the one shown in FIG. 2A). Furthermore, it is noted that location of the outer lateral face for an inner row insert depends on where the insert is located on a roller cone; it can vary from the top of the crest to the corner of the crest. Also, the leading edge 96A may be sharp, radiused, non-planar or chamfered. FIGS. 9C–9D show an insert having a conical top portion which is suitable for use as an inner row insert. It is constructed similarly to the insert of FIGS. 9A–9B.

It should be recognized that inserts with various shapes and surface finishes may be employed in embodiments of the invention. For example, inserts with a contoured surface are especially suitable. Such inserts are disclosed in U.S. Pat. No. 5,322,138. In addition, inclined chisel inserts may be employed as well. Such inclined chisel inserts are disclosed in U.S. Pat. No. 5,172,777.

Figure 10A:
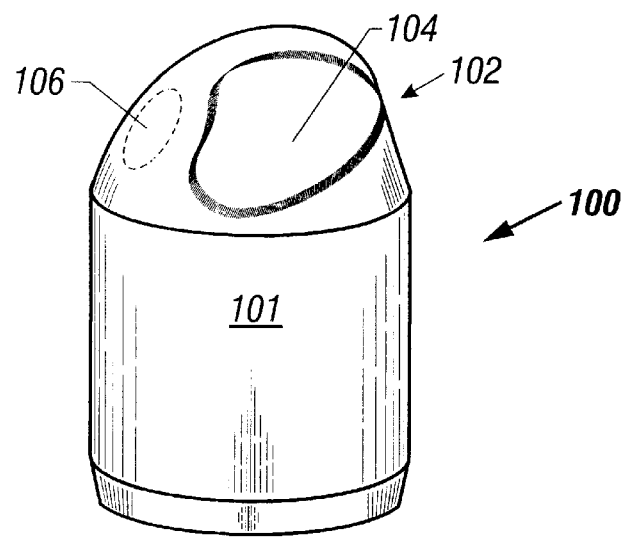
FIG. 10A is a perspective view of an insert substrate with a pocket or recess for forming a layer of superhard material in accordance with an embodiment of the invention.
Figure 10B:
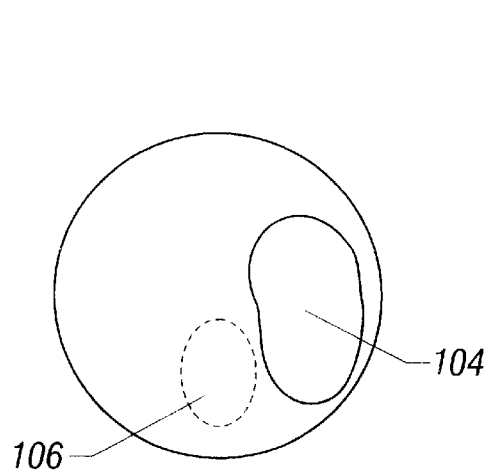
FIG. 10B is a top view of the insert substrate of FIG. 10A.
Figure 10C:
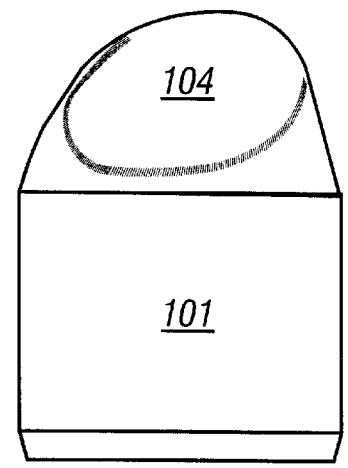
FIG. 10C is a side view of the insert substrate of FIG. 10A.

The enhanced inserts in accordance with embodiments of the invention may be manufactured by any suitable method. For example, the enhanced inserts may be manufactured by forming an appropriate pocket or recess in a substrate insert. This method is illustrated in FIGS. 10A–10C. In this method, a substrate insert, typically a tungsten carbide insert, is provided. The substrate insert 100 includes a body portion 101 and a top portion 102. A determination is made as to the location of the central region of the outer lateral face 106 on the top portion 102. Using the central region of the outer lateral face 106 as a reference, a recess or pocket is formed in a portion of the secondary region 104. The size of the area between the region 104 and the region 106 varies, depending on a number of design factors. After the pocket or recess is formed with a desired geometric shape, a superhard material composition is placed in the pocket or the recess. Then, the substrate insert with the superhard material is placed in a high-pressure/high-temperature press for bonding the superhard material to the insert substrate to form the enhanced insert.

Alternatively, the enhanced inserts may be manufactured by advantageous use of high-shear compaction tapes disclosed in pending U.S. Pat. No. 5,766,394, entitled "Method for Forming a Polycrystalline Layer of Ultra Hard Material," issued to Anderson et al. The disclosure of this patent application is incorporated by reference herein in its entirety.

The high-shear compaction tape is made from a high-shear compaction material which includes particles of superhard material such as diamond or boron nitride, organic binder such as polypropylene carbonate, and possibly residual solvents such as methyl ethyl ketone. The high-shear compaction tape is prepared in a multiple roller process. Compaction occurs during this process. After the compaction process, the tape is characterized by a high "green" density and uniform distribution of particles. Such tapes are especially suitable for manufacturing a polycrystalline diamond layer on a tungsten carbide insert in a high pressure and high temperature process.

Figure 11:
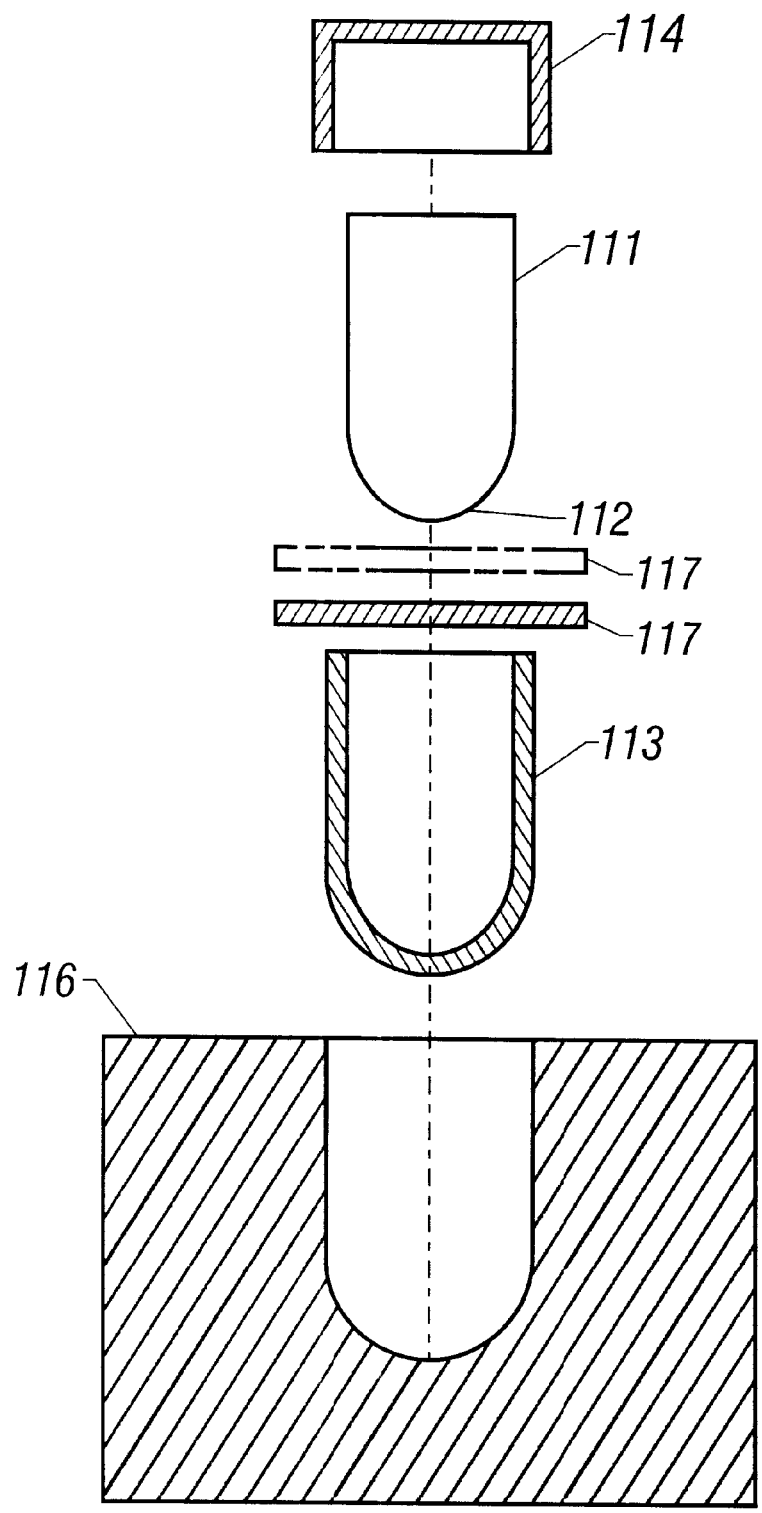
FIG. 11 is a partially sectioned exploded view of components used to fabricate an enhanced insert according to an embodiment of the invention.

FIG. 11 illustrates in exploded view components used to fabricate a polycrystalline diamond insert in accordance with embodiments of the invention. The process starts with a cemented tungsten carbide insert with a body portion 111 and a top portion 112. The polycrystalline diamond insert is made in a can 113 having an inside geometry complimentary to the geometry of the top portion 112. The can 113 and a cap 114 are typically made of niobium or other refractory metals. The can is placed in a temporary die or fixture 116 having a cavity that is complimentary to the outside geometry of the can. One or more layers of high-shear compaction sheet containing the desired superhard material compositions are placed in the hemispherical end of the can. In fact, the can serve as a mold for shaping the layer.

Figure 12:
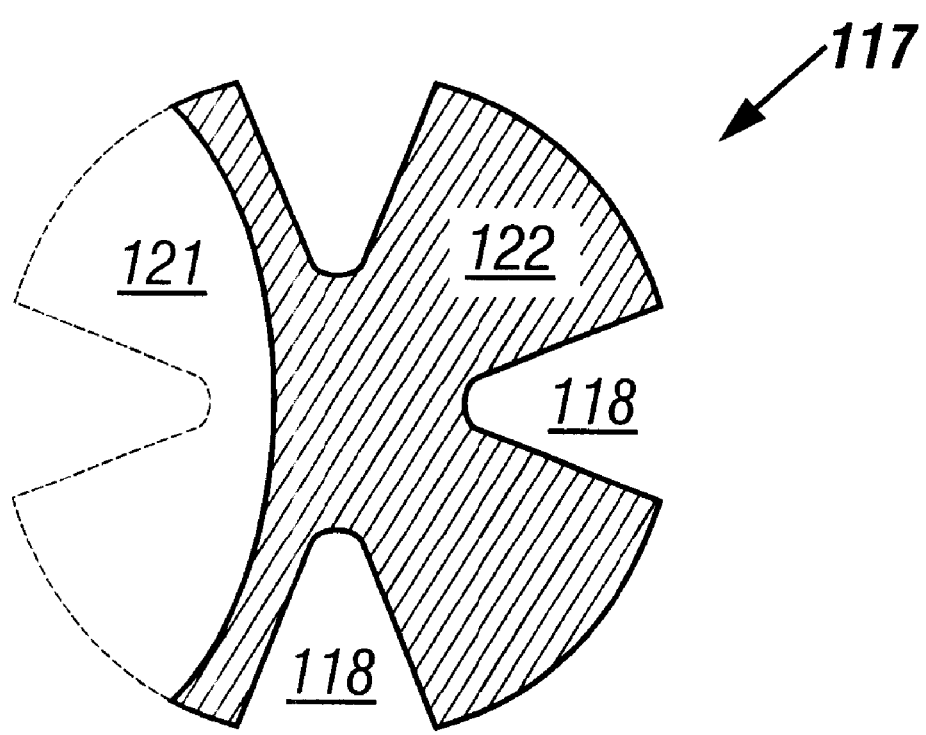
FIG. 12 is a top view of a preformed high-shear compaction tape used in FIG. 11.

Each layer comprises a preform cut from a sheet of high-shear compaction material. An exemplary preform for fitting a hemispherical top portion of an insert is illustrated in FIG. 12. The preform is a circular disk with four generally V-shaped notches 118 extending from the circumference towards the center. The notches permit the flat preform to bend into the hemispherical form of the can without extensive folding, buckling or doubling of thickness. It should be noted that the high-shear compaction sheet or tape 117 includes two areas: region 121 and region 122. The region 121 corresponds to the area on the top portion of an insert that is free of superhard material. The region 122 includes a suitable superhard material and corresponds to the area on the top portion of the insert that is provided with the superhard material. The region 121 is cut out before processing.

If one or more transition layers are desired, additional tapes containing appropriate superhard material compositions may be used. Similar to the outer layer, a transition layer typically is formed of particles of a superhard material such as diamond or boron nitride dispersed in a metal matrix such as cobalt; but the relative weight percentage may be different from that of the outer layer.

After tapes 117 are fitted into the can 113, the insert or a punch having the same shape as the insert is then pressed into the can to smooth and form the layer of high-shear compaction tapes in the end of the can. After the material is smoothed, the insert body is placed in the can (if not already there from smoothing), and the can is removed from the fixture 116. The organic binder in the high-shear compaction tapes is then removed in a subsequent dewaxing process. Afterwards, a refractory metal cap 114 is placed around and over the open end of the can 113 to effectively seal the cemented tungsten carbide body and superhard material inside the resulting assembly. Such an assembly is subsequently placed in a high pressure and high temperature press for formation of a polycrystalline diamond layer over the tungsten carbide substrate.

Instead of using a high-shear compaction tape with a hole, a high-shear compaction tape without holes may be used in alternative embodiments. In these embodiments, a slight modification of the above-described process is necessary. A high-shear compaction tape with a suitable superhard material composition is loaded into the can 113 which has a complimentary inside geometry to that of the top portion 112. A dummy insert (not shown in FIG. 11) with an identical geometry to the insert is placed into the can 113. The dummy insert is used as a jig for cutting a hole in the high-shear compaction tape in the location where no diamond is desired. After the hole is drilled in the high-shear compaction tape, the dummy insert is removed, and a carbide insert with an identical geometry to the dummy insert is placed into the can 113. At this point, the assembly may be placed in a high-pressure/high-temperature press for sintering. If the top portion 112 has an asymmetrical geometry, there is only one way that the insert could be fitted into the can 113 that includes the high-sheer compaction tape. Therefore, this modified process has the advantage of accurately bonding the superhard material to the desired regions of an insert. After the insert is placed into the can 113, the subsequent steps are identical to the above described process.

In addition to the high-shear compaction tapes, composite construction materials including a superhard material may also be used to manufacture the enhanced inserts in accordance with embodiments of the invention. Suitable composite construction materials are disclosed in a pending U.S. patent application Ser. No. 08/903668, entitled "Composite Constructions with Oriented Microstructure," filed on Jul. 31, 1997, and the disclosure of this patent application is incorporated by reference herein in its entirety.

Generally, the composite construction materials include an oriented microstructure comprising arrangements of hard phase materials such as polycrystalline diamond or polycrystalline cubic boron nitride, and relatively softer binder phase materials such as metals, metal alloys, and in some instances cermet materials. FIG. 13 illustrates two embodiments of the composite construction material.

Figure 13A:
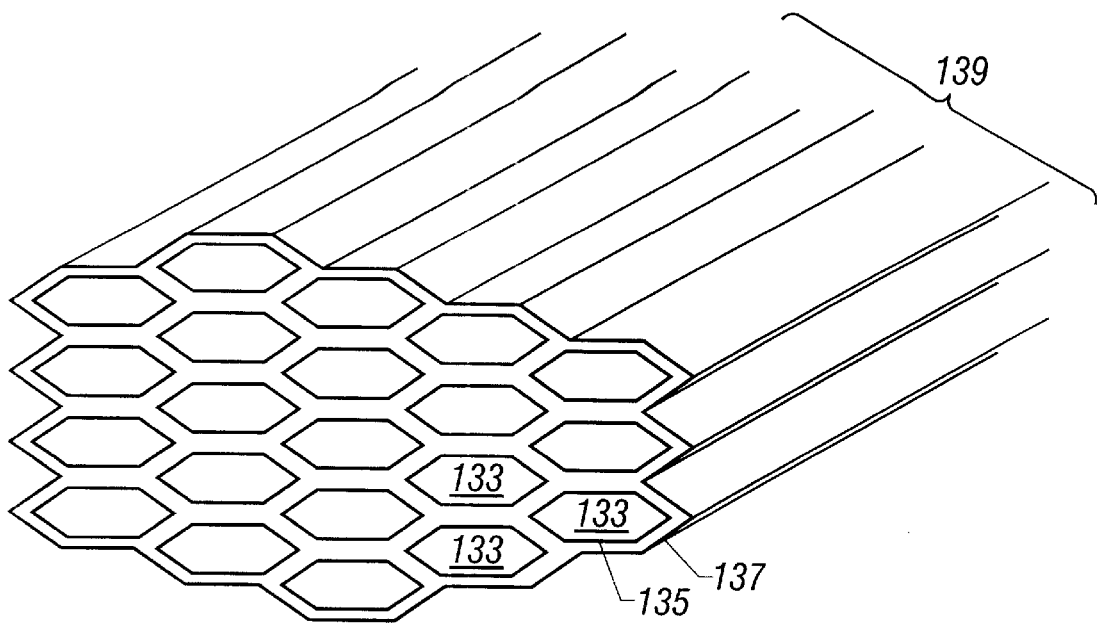
FIG. 13A is a perspective view of one embodiment of the composite construction material used in embodiments of the invention.

Referring to FIG. 13A, a first embodiment of the composite construction material includes a plurality of cased or coated fibers 133 that are bundled together. Each fiber 133 comprises a core 135 formed from a hard phase material such as polycrystalline diamond or polycrystalline cubic boron nitride. Each core 135 is surrounded by a shell or casing 137 formed from a binder phase material such as cobalt. The plurality of coated fibers 133 are oriented parallel to a common axis and are bundled together and extruded into a rod 139. This rod includes a cellular composite construction made up of binder phase material with hard phase material cores. These rods may be cut into small discs, and these discs may further be cut into the shape of the high-shear compaction tape 117 of FIG. 12 for use to manufacture the enhanced inserts in the above-described processes.

Figure 13B:
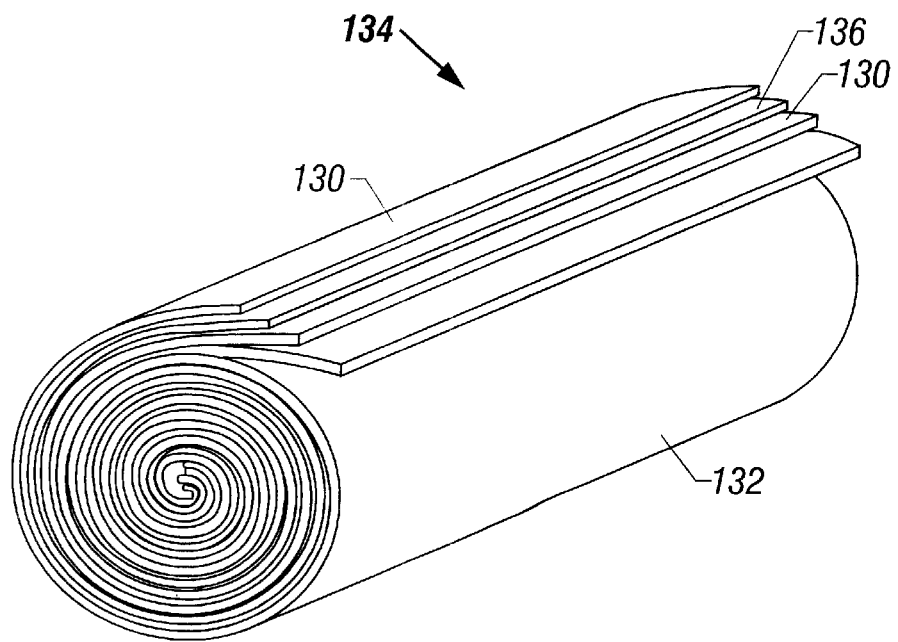
FIG. 13B is a perspective view of another embodiment of the composite construction material used in embodiments of the invention.

FIG. 13B illustrates another embodiment of the composite construction material. Referring to FIG. 13B, the composite construction material 134 includes a repeating arrangement of monolithic sheets 136 of a hard phase material and binder sheets 130 that are arranged to produce a swirled or coiled composite construction. The monolithic sheets 136 may be formed from polycrystalline diamond or polycrystalline cubic boron nitride, and the binder sheets 130 may be formed from a relatively ductile materials such as cobalt. Such a composite construction may be formed into a rod. Similar to the first embodiment, such rods may be cut into small discs for use in the manufacturing of the enhanced inserts.

It should be noted that, in some embodiments, the polycrystalline diamond layer is directly bonded to the tungsten carbide substrate. In other embodiments, one or more transition layers are placed between the polycrystalline diamond layer and the substrate to strengthen the bonding therebetween. Instead of or in addition to transition layers, an irregular interface (also referred to as "non-planar interface" by others in the art) between the polycrystalline diamond and the substrate may be employed. Various configurations of irregular interface are suitable. For example, U.S. Pat. No. 4,629,373 to Hall, entitled "Polycrystalline diamond Body With Enhanced Surface Irregularities" discloses various irregular interfaces.

The enhanced inserts according to embodiments of the invention have many applications. For example, it may be used in an earth-boring bit. Generally, an earth-boring bit includes a retention body (or a bit body) to support a plurality of inserts. The inserts are secured in the retention body and protrude from the surface of the retention body. The retention body may either be stationary or rotary while in use. The enhanced inserts may be used in such an earth-boring bit. Specifically, a roller cone rock bit for petroleum or mining drilling may be constructed using the enhanced inserts.

Figure 14:
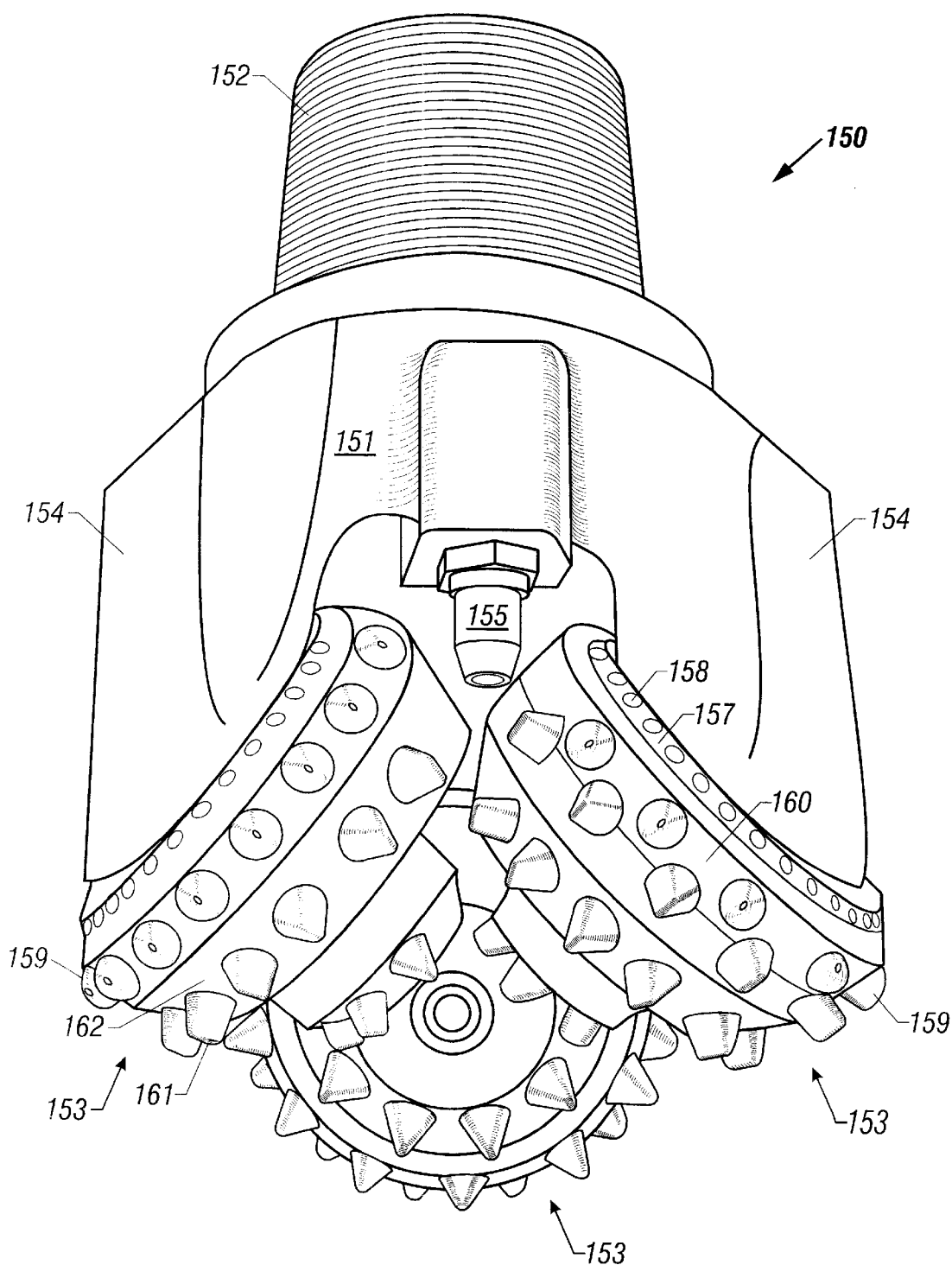
FIG. 14 is a perspective view of a typical rock bit.

FIG. 14 shows a perspective view of a rock bit constructed with the enhanced inserts according to embodiments of the invention. A rock bit 150 includes a bit body 151, having a threaded section 152 on its upper end for securing the bit to a drill string (not shown). The bit 150 generally has three roller cones 153 rotatably mounted on bearing shafts (hidden) that extend from the bit body 151. The bit body 151 is composed of three sections or legs 154 (two legs are shown) that are welded together to form the bit body. The bit 150 further includes a plurality of nozzles 155 that are provided for directing drilling fluid towards the bottom of a borehole and around the roller cones 153.

Generally, the roller cones 153 include a frustoconical surface 157 that is adapted to retain heel row inserts 158 that scrape or ream the side walls of a borehole as the roller cones rotate about the borehole bottom. The frustoconical surface 157 is referred to herein as the heel surface of the roller cone, although the same surface sometimes may be referred to by others in the art as the gage surface of the roller cone.

In addition to the heel row inserts 158 that are secured in a circumferential row of the frustoconical heel surface 157, the roller cone 153 further includes a circumferential row of gage inserts 159 secured to the roller cone in locations along or near the circumferential shoulder 160 that cut and ream the borehole corner wall to a full gage diameter. The roller cone 153 also includes a plurality of inner row inserts 161 secured to the roller cone surface 162 . These inner row inserts are usually arranged and spaced apart in respective rows. Optionally, a row of nestled gage inserts (not shown) may be disposed on the gage row between the gage row inserts 159. Furthermore, a row of off-gage inserts (not shown) also may be placed inwardly in the area away from the gage row 160. Generally, the inserts are not recessed in their respective insert holes. However, in some instances, the inserts may be recessed.

It is apparent that the enhanced inserts according to embodiments of the invention may be used as gage row inserts, off-gage inserts, nestled gage inserts, and inner row inserts. Although a petroleum rock bit is illustrated in FIG. 14, a mining rock bit may be manufactured in a similar manner. A mining rock bit is used to drill shallow holes with air being the drilling fluid.

As described above, embodiments of the invention provide an enhanced insert which may reduce and minimize the formation and propagation of localized chipping of a superhard material layer. An earth-boring bit incorporating such enhanced inserts should experience longer lifetime, higher total drilling footage and higher rate of penetration in operation. Other properties and advantages may be apparent to a person of ordinary skill in the art.

While the invention has been disclosed with respect to a limited number of embodiments, numerous modifications and variations therefrom are possible. For example, the enhanced insert may be used in any wear-resistant application, not just those described herein. While some characteristics are described in certain embodiments, it should be understood that the characteristics may be applied to other embodiments unless stated otherwise. For example, in all embodiments, the cutting edge of superhard material may be sharp, planar or non-planar or may have a radius or a chamfer. Although the embodiments of the invention are described with respect to one continuous layer of superhard material in the leading transition of the top portion, the polycrystalline diamond layer may be in the form of several discontinuous sections, and each section has a distinct composition of superhard material. The superhard material need not be in the form of a layer. Other forms, such as a piece or chunk, also are acceptable. Furthermore, the methods suitable for manufacturing the enhanced inserts are not limited to the high pressure and high temperature process. Any compaction method that bonds a layer of superhard material to a substrate may be employed. As to methods to practice the invention, they are not limited to the order of steps described herein. Any order which accomplishes the objects or results of the invention may be employed. While embodiments of the invention have been described with respect to a PCD enhanced insert, it should be noted that the invention equally applies to inserts that utilize polycrystalline boron nitride or other superhard materials. It is intended that appended claims cover all such modifications and their variations as fall within the true spirit and the scope of the invention.

What is claimed is:

1. A main cutting insert for an earth-boring bit, comprising:
   a body portion adaptable for being secured in the earth-boring bit;
   a top portion having a substrate and including a leading transition and a trailing transition; and
   a layer of superhard material provided over the substrate forming the leading transition,
   wherein the substrate forming the trailing transition is substantially free of superhard material.

2. The main cutting insert of claim 1, wherein the top portion further includes an outer lateral face having a central region and a periphery.

3. The main cutting insert of claim 2, wherein the central region of the outer lateral face is free of superhard material.

4. The main cutting insert of claim 1, wherein the layer of superhard material forms a cutting edge.

5. The main cutting insert of claim 4, wherein the cutting edge is sharp.

6. The main cutting insert of claim 4, wherein the cutting edge is chamfered.

7. The main cutting insert of claim 4, wherein the cutting edge has a radius.

8. The main cutting insert of claim 4, wherein the cutting edge is non-planar.

9. The main cutting insert of claim 1, wherein the layer of superhard material is flush with the substrate.

10. The main cutting insert of claim 1, wherein the layer of superhard material protrudes from the substrate.

11. The main cutting insert of claim 1, wherein the top portion further comprises a leading face, and the layer of superhard material is provided over the substrate forming the leading face.

12. The main cutting insert of claim 11, wherein the leading face includes a cutting edge of the superhard material.

13. The main cutting insert of claim 1, wherein the top portion further comprises a crest, and the layer of superhard material is provided over at least a portion of the substrate forming the crest.

14. The main cutting insert of claim 13, wherein the crest further includes a cutting edge of the superhard material.

15. The main cutting insert of claim 1, wherein the top portion further comprises a trailing face, and the layer of superhard material is not provided over a portion of the substrate forming the trailing face.

16. The main cutting insert of claim 1, wherein the top portion further comprises a crest and a leading face, and the layer of superhard material is provided over at least a portion of the substrate forming the crest and the leading face.

17. The main cutting insert of claim 16, wherein the crest and the leading face further include a cutting edge of the superhard material.

18. The main cutting insert of claim 1, wherein the superhard material includes diamond.

19. The main cutting insert of claim 1, wherein the insert includes a substantially cylindrical body portion and a substantially chisel-shaped top portion.

20. The main cutting insert of claim 1, wherein the insert includes a substantially cylindrical body portion and a substantially semi-round top portion.

21. The main cutting insert of claim 1, wherein the insert includes a substantially cylindrical body portion and a substantially hemispherical top portion.

22. The main cutting insert of claim 1, wherein the insert includes a substantially cylindrical body portion and a substantially asymmetrical top portion.

23. The main cutting insert of claim 1, wherein the insert is a shaped insert.

24. The main cutting insert of claim 1, wherein the insert is a gage insert.

25. The main cutting insert of claim 1, wherein the insert is an off-gage insert.

26. The main cutting insert of claim 1, wherein the insert is a nestled gage insert.

27. The main cutting insert of claim 1, wherein the insert is an inner row insert.

28. A main cutting insert for an earth-boring bit, comprising:
   a body portion adaptable for being secured in the earth-boring bit;
   a top portion having a substrate; and
   a layer of superhard material provided over a portion of the substrate, the layer of superhard material having a leading cutting edge and a thickness portion immediately adjacent to the cutting edge,
   wherein the thickness portion of the layer of superhard material trails the leading cutting edge when the main cutting insert is used to form a borehole.

29. The main cutting insert of claim 28, wherein the leading edge substantially cuts the diameter of a borehole when the main cutting insert is used to form the borehole.

30. A main cutting insert for an earth-boring bit, comprising:
   a body portion adaptable for being secured in the earth-boring bit;
   a top portion for extending from the earth-boring bit, the top portion including an outer lateral face having a peripheral region and a central region; and
   a layer of superhard material provided over a portion of the substrate in the peripheral region, but not over the substrate in the central region of the outer lateral face.

31. The main cutting insert of claim 30, wherein the outer lateral face includes a centroid which is free of superhard material.

32. The main cutting insert of claim 30, wherein the top portion includes a leading edge in the peripheral region, and the layer of superhard material is provided in the leading edge.

33. A rock bit for drilling a borehole, comprising:
   a bit body;
   a roller cone rotatably mounted on the bit body;
   a plurality of main cutting inserts located on the roller cone to cut at least a portion of a borehole corner or a borehole bottom, at least one insert comprising:
      a body portion secured in the roller cone;
      a top portion extending from the roller cone, the top portion having a substrate and including a leading transition and a trailing transition; and
      a layer of superhard material provided over the substrate forming the leading transition,
   wherein the substrate forming the trailing transition is substantially free of superhard material.

34. The rock bit of claim 33, wherein the top portion further comprises an outer lateral face having a central region and a periphery, and the substrate in the central region of the outer lateral face is free of superhard material.

35. The rock bit of claim 33, wherein the top portion further comprises a leading face, and the layer of superhard material is provided over the substrate forming the leading face.

36. The rock bit of claim 33, wherein the top portion further comprises a crest, and the layer of superhard material is provided over the substrate forming the crest.

37. The rock bit of claim 33, wherein the top portion further comprises a trailing face, and the layer of superhard material is provided over a portion of the substrate forming the trailing face.

38. The rock bit of claim 33, wherein the superhard material includes diamond.

39. The rock bit of claim 33, wherein the superhard material includes boron nitride.

40. The rock bit of claim 33, wherein the superhard material includes diamond particles and a metal selected from the group consisting of cobalt, nickel, iron, and alloys thereof.

41. The rock bit of claim 40, wherein the superhard material further includes particles of carbide or carbonitride of elements selected from the group consisting of tungsten, titanium, tantalum, chromium, molybdenum, vanadium, hafnium, zirconium, and alloys thereof.

42. The rock bit of claim 33, wherein the insert includes a substantially cylindrical body portion and a substantially chisel-shaped top portion.

43. The rock bit of claim 33, wherein the insert includes a substantially cylindrical body portion and a substantially semi-round top portion.

44. The rock bit of claim 33, wherein the insert includes a substantially cylindrical body portion and a substantially hemispherical top portion.

45. The rock bit of claim 33, wherein the insert includes a substantially cylindrical body portion and a substantially asymmetrical top portion.

46. The rock bit of claim 33, wherein the insert is a shaped insert.

47. The rock bit of claim 33, wherein the body portion of the insert is formed of a carbide composition.

48. The rock bit of claim 33, wherein the substrate of the insert is formed of a carbide composition.

49. The rock bit of claim 33, wherein the top portion includes a transition layer between the substrate and the layer of superhard material.

50. The rock bit of claim 49, wherein the transition layer includes diamond particles and tungsten carbide particles.

51. The rock bit of claim 33, wherein the top portion includes a plurality of transition layers between the substrate and the layer of superhard material.

52. The rock bit of claim 33, wherein the top portion includes an irregular interface between the substrate and the layer of superhard material.

53. The rock bit of claim 34, wherein the layer of superhard material is continuous.

54. The rock bit of claim 33, wherein the roller cone includes a gage row, and the insert is located in the gage row.

55. The rock bit of claim 33, wherein the roller cone includes an off-gage row, and the insert is located in the off-gage row.

56. The rock bit of claim 33, wherein the roller cone includes a nestled gage row, and the insert is located in the nestled gage row.

57. The rock bit of claim 33, wherein the roller cone includes an inner row, and the insert is located in the inner row.

58. The rock bit of claim 33, wherein a cutting edge of superhard material is formed on the top portion.

59. A rock bit for drilling a borehole, comprising:
   a bit body;
   a roller cone rotatably mounted on the bit body;
   a plurality of main cutting inserts located on the roller cone to cut at least a portion of a borehole corner or a borehole bottom, at least one insert comprising:

a body portion secured in the roller cone;

a top portion extending from the roller cone and having a substrate; and a layer of superhard material provided over a portion of the substrate, the layer of superhard material having a leading cutting edge and a thickness portion immediately adjacent to the cutting edge, wherein the thickness portion of the layer of superhard material trails the leading cutting edge when the rock bit having the main cutting insert is used to form a borehole.

60. The rock bit of claim 59, wherein the thickness portion defines a surface substantially parallel to the surface of the borehole when the leading edge contacts the borehole.

61. The rock bit of claim 60, wherein the leading edge contacts the bottom of the borehole.

62. The rock bit of claim 60, wherein the leading edge contacts the corner of the borehole.

63. The rock bit of claim 60, wherein the top portion includes an outer lateral face, leading face, a crest, and at least a portion of the leading cutting edge occurs at the transition of the outer lateral face, the leading face, and the crest.

64. A rock bit for drilling a borehole, comprising:

a bit body;

a roller cone rotatably mounted on the bit body;

a plurality of main cutting inserts located on the roller cone to cut at least a portion of a borehole corner or a borehole bottom, at least one insert comprising:

a body portion secured in the roller cone;

a top portion extending from the roller cone, the top portion including an outer lateral face having a peripheral region and a central region; and a layer of superhard material provided over a portion of the substrate, the layer of superhard material having a cutting edge and a thickness portion immediately adjacent to the cutting edge, the thickness portion defining a surface, wherein when the rock bit is used to form the borehole, the surface of the thickness portion is substantially parallel to the surface of the borehole as the cutting edge contacts the borehole.

65. A rock bit for drilling a borehole, comprising:

a bit body;

a roller cone rotatably mounted on the bit body;

a plurality of main cutting inserts located on the roller cone to cut at least a portion of a borehole corner or a borehole bottom, at least one insert comprising:

a body portion secured in the roller cone;

a top portion extending from the roller cone, the top portion including an outer lateral face having a peripheral region and a central region; and a layer of superhard material provided over a portion of the substrate in the peripheral region, but not over the substrate in the central region of the outer lateral face.

66. A rock bit, comprising:

a bit body having a leg;

a roller cone rotatably mounted on the leg;

a plurality of main cutting inserts located on a row of the roller cone to cut at least a portion of a borehole corner or a borehole bottom, each insert comprising:

a substantially cylindrical body portion secured in the roller cone;

a top portion extending from the roller cone, the top portion having an outer surface and including a cemented tungsten carbide substrate, the outer surface having an outer lateral face, a leading face, a leading edge, a crest, a trailing face, and a trailing edge, and a continuous layer of polycrystalline diamond provided over the substrate forming the leading edge and a portion of the leading face, wherein the substrate forming the outer lateral face, the trailing edge, and the trailing face is substantially free of superhard material.

* * * * *